United States Patent
Breedvelt-Schouten et al.

(10) Patent No.: US 11,402,966 B2
(45) Date of Patent: *Aug. 2, 2022

(54) INTERACTIVE DIMENSIONAL HIERARCHY DEVELOPMENT

(71) Applicant: International Business Machines Corporation, Armonk, NY (US)

(72) Inventors: Ilse Breedvelt-Schouten, Ottawa (CA); Mark Kiel, Birmingham, AL (US)

(73) Assignee: International Business Machines Corporation, Armonk, NY (US)

( * ) Notice: Subject to any disclaimer, the term of this patent is extended or adjusted under 35 U.S.C. 154(b) by 27 days.

This patent is subject to a terminal disclaimer.

(21) Appl. No.: 16/454,675

(22) Filed: Jun. 27, 2019

(65) Prior Publication Data

US 2020/0233542 A1 Jul. 23, 2020

Related U.S. Application Data

(63) Continuation of application No. 16/253,399, filed on Jan. 22, 2019.

(51) Int. Cl.
| | | |
|---|---|---|
| *G06F 3/0482* | (2013.01) | |
| *G06F 3/0484* | (2022.01) | |
| *G06F 9/451* | (2018.01) | |

(52) U.S. Cl.
CPC .......... *G06F 3/0482* (2013.01); *G06F 3/0484* (2013.01); *G06F 9/453* (2018.02)

(58) Field of Classification Search
CPC ....... G06F 3/0482; G06F 9/453; G06F 3/0484
See application file for complete search history.

(56) References Cited

U.S. PATENT DOCUMENTS

| | | |
|---|---|---|
| 7,516,084 B1 | 4/2009 | Sankaran et al. |
| 9,182,948 B1 | 11/2015 | O'Riordan |

(Continued)

FOREIGN PATENT DOCUMENTS

WO    WO2005036334 A2    4/2005

OTHER PUBLICATIONS

P. Mell, et al. "*The NIST Definition of Cloud Computing*", NIST Special Publication 800-145, Sep. 2011, Gaithersburg, MD.

(Continued)

*Primary Examiner* — Anil K Bhargava
(74) *Attorney, Agent, or Firm* — Alexander Jochym; George S. Blasiak; Heslin Rothenberg Farly & Mesiti PC

(57) ABSTRACT

Methods, computer program products, and systems are presented. The method computer program products, and systems can include, for instance: examining change request data defined by the certain analyst user with use of a user interface of a planning application, the change request data defining a change to the dimensional hierarchy used by the planning application, wherein the user interface includes an area that displays a dimensional hierarchy being authored by a certain analyst user; generating a change request data record in dependence on the examining, wherein the change request data record specifies attributes of the change to the dimensional hierarchy; and using data of the change request data record to present prompting data for guiding the certain analyst user in further changing the dimensional hierarchy.

20 Claims, 20 Drawing Sheets

(56) References Cited

U.S. PATENT DOCUMENTS

| | | | |
|---|---|---|---|
| 2003/0023471 A1* | 1/2003 | Kettler, III | G06Q 10/0631 |
| | | | 705/7.12 |
| 2008/0235249 A1* | 9/2008 | Stephens | G06F 16/282 |
| 2009/0210430 A1 | 8/2009 | Averbuch et al. | |
| 2011/0138340 A1* | 6/2011 | Holm-Petersen | G06Q 10/10 |
| | | | 715/854 |
| 2014/0214753 A1* | 7/2014 | Guerra | G06F 16/254 |
| | | | 707/602 |
| 2017/0315784 A1* | 11/2017 | Sarferaz | G06F 9/44505 |

OTHER PUBLICATIONS

I. Breedvelt-Schouten, "*Interactive Dimensional Hierarchy Development*", U.S. Appl. No. 16/253,399, filed Jan. 22, 2019.
List of IBM Patent and/or Patent Applications treated as related for U.S. Appl. No. 16/454,675, filed Jun. 27, 2019, dated Jun. 27, 2019.
Non-Final Rejection, U.S. Appl. No. 16/253,399, filed Jan. 22, 2019, dated May 13, 2020.
Response to Non-Final Rejection, U.S. Appl. No. 16/253,399, filed Jan. 22, 2019, dated Aug. 13, 2020.
Notice of Allowance in U.S. Appl. No. 16/253,399 dated Mar. 24, 2021.

\* cited by examiner

INTERACTIVE DIMENSIONAL HIERARCHY DEVELOPMENT

CROSS-REFERENCE TO RELATED APPLICATION

This application is a continuation of U.S. application Ser. No. 16/253,399, filed Jan. 22, 2019, titled "Interactive Dimensional Hierarchy Development", which is incorporated by reference herein in its entirety.

BACKGROUND

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

SUMMARY

Shortcomings of the prior art are overcome, and additional advantages are provided, through the provision, in one aspect, of a method. The method can include, for example: examining change request data defined by the certain analyst user with use of a user interface of a planning application, the change request data defining a change to the dimensional hierarchy used by the planning application, wherein the user interface includes an area that displays a dimensional hierarchy being authored by a certain analyst user; generating a change request data record in dependence on the examining, wherein the change request data record specifies attributes of the change to the dimensional hierarchy; and using data of the change request data record to present prompting data for guiding the certain analyst user in further changing the dimensional hierarchy.

In another aspect, a computer program product can be provided. The computer program product can include a computer readable storage medium readable by one or more processing circuit and storing instructions for execution by one or more processor for performing a method. The method can include, for example: examining change request data defined by the certain analyst user with use of a user interface of a planning application, the change request data defining a change to the dimensional hierarchy used by the planning application, wherein the user interface includes an area that displays a dimensional hierarchy being authored by a certain analyst user; generating a change request data record in dependence on the examining, wherein the change request data record specifies attributes of the change to the dimensional hierarchy; and using data of the change request data record to present prompting data for guiding the certain analyst user in further changing the dimensional hierarchy.

In a further aspect, a system can be provided. The system can include, for example a memory. In addition, the system can include one or more processor in communication with the memory. Further, the system can include program instructions executable by the one or more processor via the memory to perform a method. The method can include, for example: examining change request data defined by the certain analyst user with use of a user interface of a planning application, the change request data defining a change to the dimensional hierarchy used by the planning application, wherein the user interface includes an area that displays a dimensional hierarchy being authored by a certain analyst user; generating a change request data record in dependence on the examining, wherein the change request data record specifies attributes of the change to the dimensional hierarchy; and using data of the change request data record to present prompting data for guiding the certain analyst user in further changing the dimensional hierarchy.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
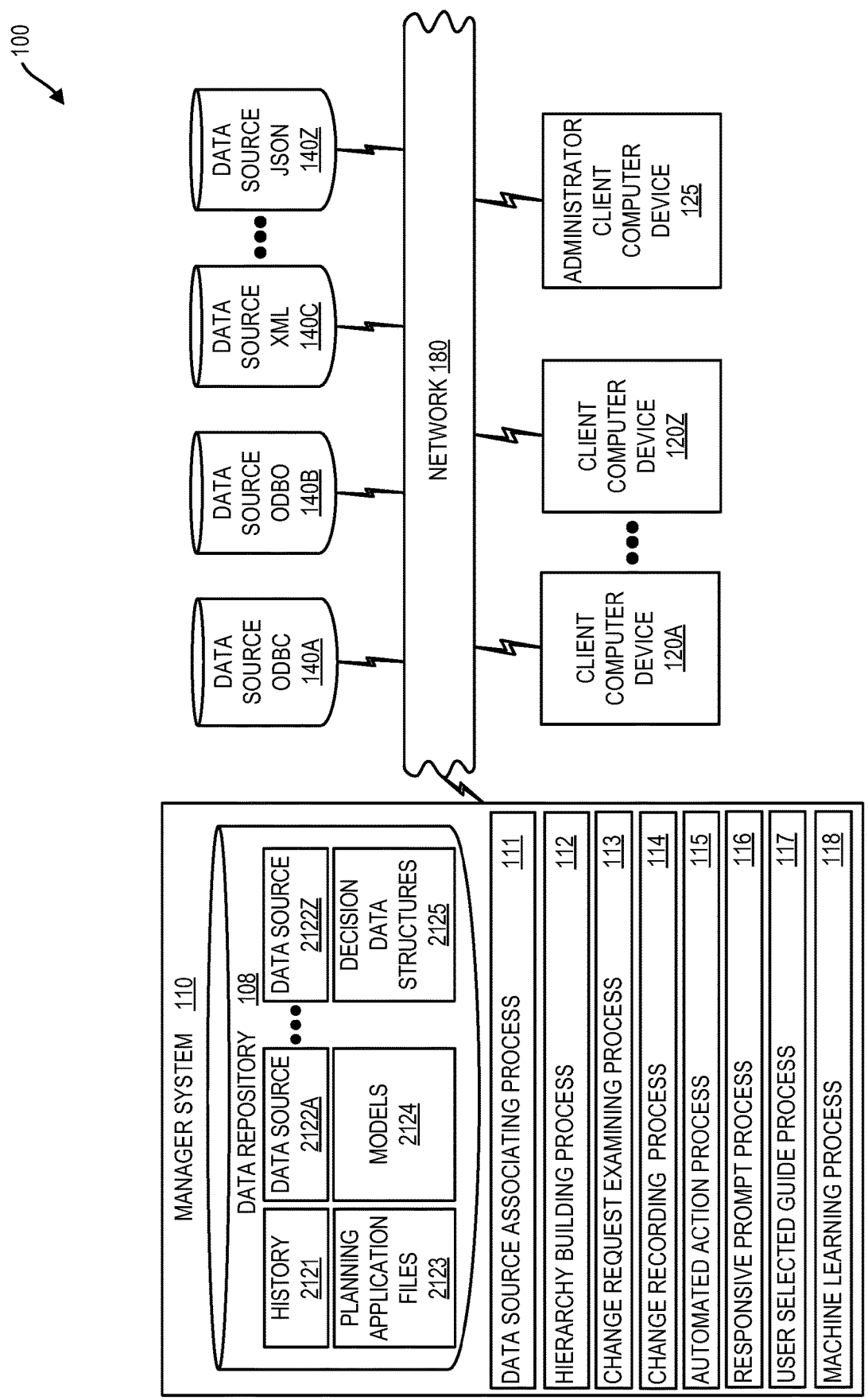
FIG. 1 is a block diagram of a system having a manager system, client computer devices, an administrator client computer device, and a plurality of data sources according to one embodiment.

System 100 for the development of dimensional hierarchies and planning application is shown in FIG. 1. System 100 can include manager system 110 having an associated data repository 108, client computer devices 120A-120Z, administrator client computer device 125, and data sources 140A-140Z. Manager system 110, client computer devices 120A-120Z, administrator client computer device 125, and data sources 140A-140Z can be in communication with one another via network 180. System 100 can include numerous devices which can be computing node based devices which can be connected by network 180. Network 180 may be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

According to one embodiment, manager system 110 can be external to client computer devices 120A-120Z, administrator client computer device 125, and data sources 140A-140Z. According to one embodiment, manager system 110 can be collocated with one or more of client computer devices 120A-120Z, administrator client computer device 125, and data sources 140A-140Z. Each of the different client computer devices 120A-120Z can be associated to a different user.

Client computer devices 120A-120Z can be computing node based client computer devices provided by a client computer, e.g. a PC or a mobile computer device such as, e.g. smartphone, tablet, laptop, or smartwatch. Client computer devices 120A-120Z according to one embodiment can run a web browser for opening and viewing webpages defining web based displayed user interfaces. Administrator client computer device 125 according to one embodiment can be provided by a client computer such as a PC or a mobile device, e.g. smartphone, tablet, laptop, or smartwatch. Administrator client computer device 125 can run one or more program, e.g. including a web browser for opening and viewing webpages defining a web based displayed user interface.

Respective data sources 140A-140Z can be associated to a user interface displayed on a display of a client computer device and can store file data of differentiated file formats. The content of such file data can include dimensional hierarchy data that defines various dimensional hierarchies. Dimensional hierarchies can be of e.g. products, sales teams, managerial teams, and similar.

According to one embodiment, data source 140A be provided by an open database connectivity (ODBC) data source provided by an ODBC database. ODBC is a standard application programming interface (API) for accessing database management systems (DBMS). ODBC can be provided to be independent of database systems and operating systems. Using ODBC an application written can be ported to other platforms.

Data source 140B can be provided by an object linking and embedding database for online analytical processing (ODBO) data source provided by an ODBO database. ODBO is a standard application programming interface (API) for exchanging metadata and data between an online analytical processing (OLAP) server and a client computer device. According to one embodiment, data source 140A can be accessible with use of structured queried language (SQL) commands and data source 140B can be accessible with use of multidimensional expression (MDX) commands.

Data source 140C can be an XML data source provided by an XML database and can store text based extensible markup language (XML) files. Data source 140Z can be a java script object notation (JSON) data source provided by a JSON database and can store text based JSON files.

Manager system 110 according to one embodiment can be configured to support the development of dimensional hierarchies in an enterprise planning application. The planning application can include features e.g. for process control budgeting, allocation of resources and/or forecasting. A planning application can include features for process control, e.g. for manufacturing and/or distribution of articles and/or for digital rights allocation. A planning application can help an organization automate manual spreadsheet processes and link financial plans to operational tactics. A planning application can facilitate, e.g. complex dimensional calculations to analyze product and customer profitability, sales mix, and price volume variance. A planning application can help users discover insights automatically directly from their data to drive decision making using predictive analytics. A planning application can manage scheduling cost control, budgetary concerns, resource allocation, collaborations, communications, decision making, quality management, and documentation.

Embodiments herein recognize that a major characteristic of planning applications is their use of dimensional hierarchies. A planning application can use a plurality of different dimensional hierarchies. A plurality of different dimensional hierarchies can have different associated subjects. For example, a first dimensional hierarchy can be associated to a product subject, a second dimensional hierarchy can be associated to raw materials for manufacture of a product, a third dimensional hierarchy can be associated to a sales team organization, and a fourth dimensional hierarchy can be associated to a managerial team subject.

An authored dimensional hierarchy of a planning system can be employed as an interface process control. For example, in the context of a product related dimensional hierarchy, the dimensional hierarchy can be accessed for inventory process control wherein for example system 100 can include a fleet of autonomous vehicles that query content of a product dimensional hierarchy for pickup and delivery of products to various distribution centers e.g. to balance an inventory of products across the distribution centers. In the context of a raw materials dimensional hierarchy, system 100 can be configured to automatically access content of the dimensional hierarchy so that raw materials are automatically sourced in appropriate amounts at various stages of a robot automated manufacturing process. In the context of a personnel organization dimensional hierarchy, e.g. a sales team or managerial team, system 100 can be configured to automatically access content of the personnel dimensional hierarchy for control, e.g. of digital rights allocations, e.g. an enterprise can provide access to its personnel various digital content, e.g. user interactive training manuals, training applications, but in accordance with features of system 100 can differentiate the distribution of digital rights amongst personnel in dependence on a node member location of a member of the personnel group within a dimensional hierarchy.

Embodiments herein recognize that with use of existing systems, development of dimensional hierarchies is a cumbersome process for analysts with use of existing planning application software. The existing development process for defining dimensional hierarchies leaves analyst users susceptible to data entry errors and errors in data can go undetected for extended periods of time, limiting the performance of a planning application. Embodiments herein can include various features for improved development of dimensional hierarchies in a planning application. Embodiments herein can include features to allow users to automatically access hierarchical data content for multiple different data sources. Embodiments herein can include features to examine change requests received from analyst users for return of data respecting a change request. Embodiments herein can facilitate recording of change data respecting changes to a dimensional hierarchy.

Data repository 108 can store various data. In history area 2121 data repository 108 can store historical data specifying changes made to dimensional hierarchies by analyst users over time. History area 2121 can include for each change of a dimensional hierarchy a record for the change that can include such data as the data source associated to the change, change classification, a node specification, e.g. specifying the nodal position in a hierarchy in which the change was made and labels associated to affected nodes, a change description, a timestamp specifying the time of the change, and a user ID specifying the analyst user authoring the change. Within history area 2121 there can be included a users area that specifies data on users such as analyst users using system 100 to author dimensional hierarchies and updates thereto. In history area 2121, each discrete dimensional hierarchy can be assigned by manager system 110 identifier, such as universally-unique identifier UUID. In some embodiments, the dimensional hierarchy can be mapped on a one-to-one basis to a file having a unique file name for support of a planning application wherein the file and the dimensional hierarchy are mapped on a one-to-one basis.

Data repository 108 can include data sources 2122A-2122Z defined e.g. by directories and/or files having dimensional hierarchy data. A first data source of data sources 2122A-2122Z can be provided by a file directory storing, e.g. XLS files that contain dimensional hierarchy data. Another data source of data source 2122A-2122Z can be provided by a file directory that stores, e.g. CSV files that contain dimensional hierarchy data.

Data repository 108 in planning application files area 2123 can store files that are created and acted on by processes described herein and are used by one or more planning application for providing planning application functionalities.

Data repository 108 in models area 2124 can store models that are utilized by manager system 110 in the performance of predictive analytics. Models of models area 2124 can include predictive models that are trained using machine learning processes.

Data repository 108 in decision data structures area 2125 can store decision data structures for use by manager system 110 for returning action decisions, such as action decisions defining functionalities of a user interactive interface that can interact with an analyst user for the development of hierarchical dimensions in a planning application.

Manager system 110 can run various processes for facilitating development of hierarchical dimensions in a planning application. Manager system 110, for example, can run data source associating process 111, hierarchy building process 112, change request examining process 113, change recording process 114, automated action process 115, responsive prompt process 116, user selected guide process 117, and machine learning process 118.

Manager system 110 running data source associating process 111 can include manager system 110 associating selected data source to a user interface for use in building dimensional hierarchies. Manager system 110 running data source associating process 111 can include manager system 110 associating a data source to a user interface. A data source that is associated to a user interface can have one or more characterizing feature. Characterizing features can include, e.g. (a) a user interface control element of the user interface can be configured to facilitate access of data from the associated data source. Another characterizing feature (b) can be the characterizing feature that a user can be guided by a user interface to access data from a data source that has been associated to a user interface. Guiding can include, e.g. the presentment of prompting data to guide an analyst user to select data from a particular location of an associated data source, e.g. with a location of a dimensional hierarchy being authored having been designated. Another characterizing feature (c) can be the characterizing feature that with a data source associated to a user interface, manager system 110 can automatically record a reference to a particular location of a data source selected by a user for populating a location of a dimensional hierarchy being authored. An administrator user can associate one or more data source to a user interface for use in authoring a dimensional hierarchy at a configuration stage of the user interface. In addition or alternatively, a user interface can have a feature so that an analyst user can designate and associate new data sources for association to a user interface during live deployment of a user interface.

The respective data sources 2122A-2122Z and data sources 140A-140Z can be associated to a displayed user interface that displays a dimensional hierarchy being authored. Associating a data source to such a user interface can include configuring on the user interface an interface control element e.g. a control button for access to dimensional hierarchy data of the data source. Associating a data source to a user interface can include configuring the user interface so that the user interface can guide an analyst user to a selected certain location of a data source, e.g. column, columns and sheet. Associating a data source to a user interface can include configuring the user interface so that when an analyst user uses prompting data defining guide data (e.g. a guide window) to select a certain location of a data source the certain location is recorded for storage as a data source parameter value of a change request data record. The change request data record can be later used to update a dimensional hierarchy being authored to include updated content of that certain location of the data source.

According to one embodiment, data sources 2122A-2122Z can be provided by directory stored spreadsheet files stored in directories accessible from client computer devices 120A-120Z. Data sources 2122A-2122Z can be provided e.g. by directory stored spreadsheet files of various formats such as XLS or CSV or similar. Data sources 2122A-2122Z according to one embodiment can be locally stored data sources, e.g. in a local network in common with a local network in which processes 111-118 can be run according to one embodiment.

According to one embodiment, data sources 140A-140Z can be provided by databases having respective database management systems (DBMSs) that are responsive to data queries from manager system 110. The databases can organize data in tables having rows and column. Databases defining data sources 140A-140Z can include e.g. ODBC databases, ODBO databases, XML databases, and JSON databases.

Manager system 110 running hierarchy building process 112 can, for example, present prompting data to an analyst user defining guide data to guide authoring of a dimensional hierarchy. The prompting data can include e.g. prompting data to interactively display a dimensional hierarchy in its current state, graphical user interface (GUI) features to add to the hierarchy, GUI features to replace node members, GUI features to remove node members GUI features to move node members and the like. Manager system 110 can present prompting data defining guide data on a user interface to guide a user in the development of a dimensional hierarchy. The prompting data defining guide data can include prompting data e.g. to facilitate selection of a location on a dimensional hierarchy, to facilitate selection of a data source from which content is to be imported, and to facilitate selection of a location of a selected data source. The prompting data can include prompting data that facilitates mode selections. The prompting data can include prompting data to prompt an analyst user to implement a certain change to a dimensional hierarchy. The prompting data can graphically depict attributes of an historical development of a dimensional hierarchy. The prompting data can be in dependence on predictions performed by manager system 110.

Manager system 110 running change request examining process 113 can examine change request data defined by an analyst user when making a change to a dimensional hierarchy to return data specifying attributes of the change. Attributes of a change identified by the examining can include attributes specifying, e.g. (i) a data source associated to the change, (ii) a classification of the change, (iii) a node specification for the change, (iv) a change description, (v) a timestamp for the change, and (vi) a user ID specifying an analyst user authoring the change.

Manager system 110 running change recording process 114 can store change data returned by running of change request examining process 113 into history area 2121 of data repository 108.

Manager system 110 running automated action process 115 can, e.g. examine data of data sources for updates and data of history area 2121 and based on such examining can return various automated actions, such as actions to prompt users to author changes to a current dimensional hierarchy and/or automated processes to automatically author changes to a current dimensional hierarchy. Manager system 110 can for example use a change request data record to perform an automatic update of the dimensional hierarchy being authored in response an update of data at the certain location of the associated data source. The automatic update can be performed by manager system 110 e.g. in response to a user input prompted for by prompting data presented by manager system 110 or without any analyst user input.

Manager system 110 running responsive prompt process 116 can examine change request data for changing a dimensional hierarchy initiated by an analyst user and responsive to the received change request data, predict dimensional hierarchy changes being authored and can responsively present prompts in dependence on returned predictions.

Manager system 110 running user selected guide process 117 can present in analyst user selected format historical data specifying a history of changes to a dimensional hierarchy.

Manager system 110 running machine learning process 118 can, e.g. train a predictive model for use by manager system 110 in returning predictions as to changes of a current dimensional hierarchy that may be authored by an analyst user.

Embodiments herein recognize that analyst users are more frequently using mobile client computer devices for a variety of reasons. According to one scenario, an analyst user who is using a planning application may be presenting results provided by planning application to an interested party. As such, the analyst user can often be in transit, e.g. travelling to a meeting location and may only have access to mobile client computer device such as a handheld client computer device. In another scenario, an analyst user can be performing development and analysis activities using multiple client computer devices simultaneously. In such a scenario, where multiple client computer devices are utilized, an analyst user's mobile, e.g. handheld client computer device can be used to provide a supplemental portal for performance of development and/or analyst activities. In accordance with further aspects as set forth herein, embodiments herein include features to provide interactive functionalities for the development of dimensional hierarchies using client computer devices having small screens, such as mobile handheld client computer devices as may be provided, e.g. by a smartphone. The interactive functions can include functions to automatically update a dimensional hierarchy that simplifies or eliminated analyst user interactions associated to a dimensional hierarchy change.

Figure 2:
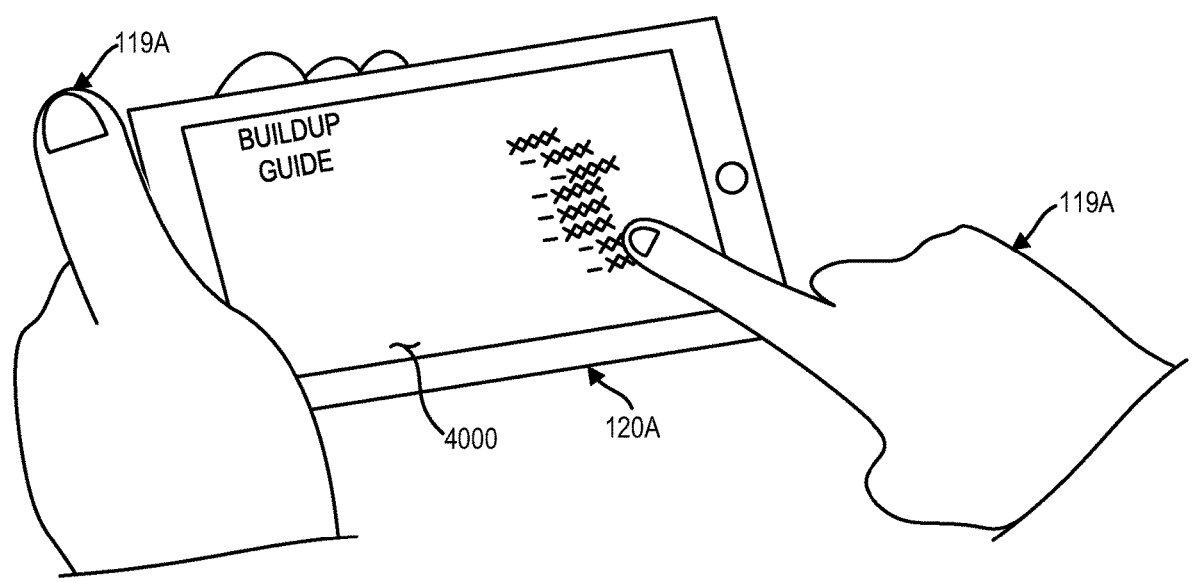
FIG. 2 is a physical form view illustrating a client computer device provided by a handheld mobile client computer device in use by an analyst user according to one embodiment.

FIG. 2 depicts use of system 100 by an analyst user 119A who is using client computer device 120A provided by a mobile handheld client computer device having a small screen that displays user interface 4000, which can be a displayed user interface which can be served by manager system 110.

Figure 3A:
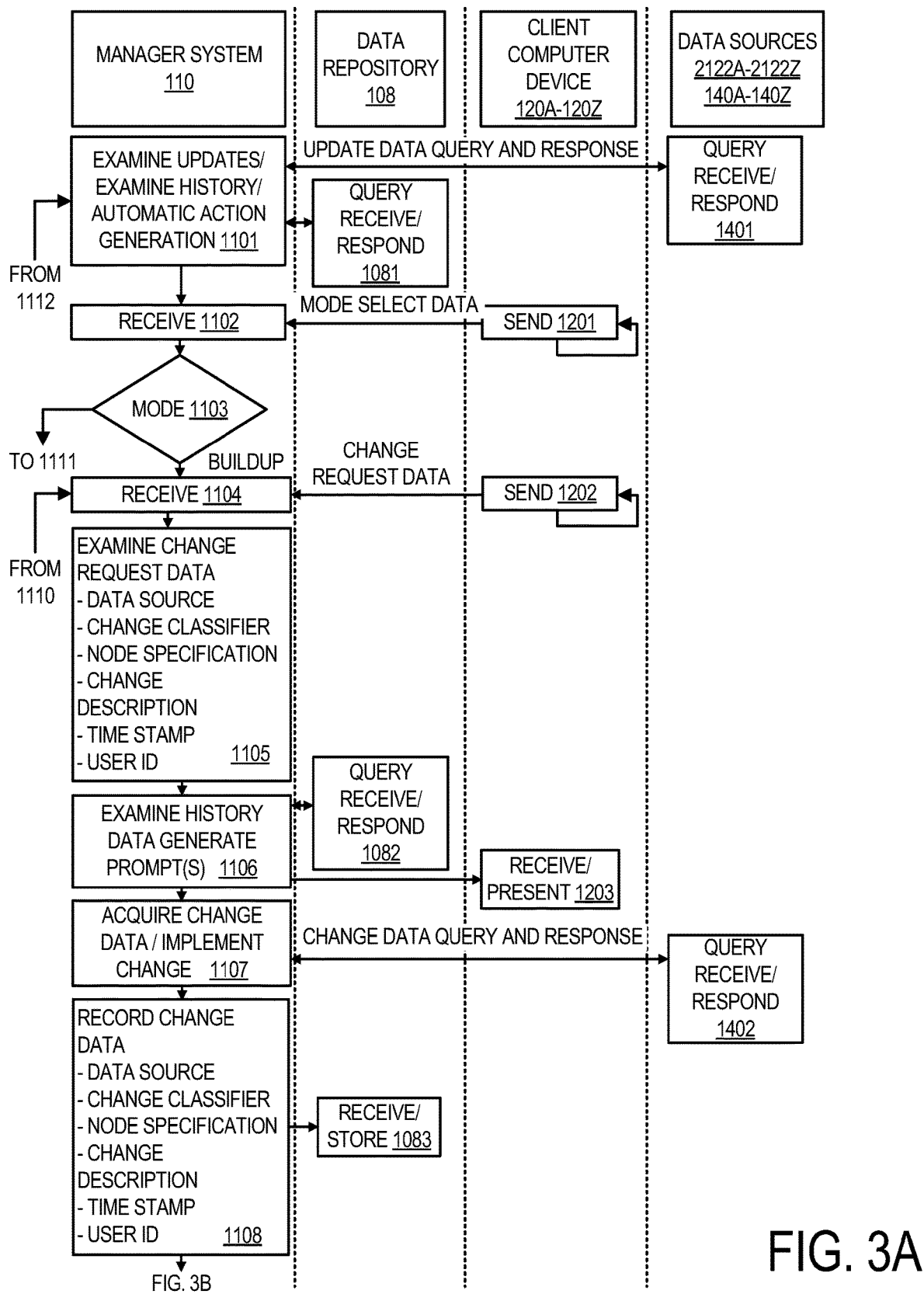
FIGS. 3A-3B is a flowchart illustrating a method for performance by a manager system interoperating with a client computer device and data sources according to one embodiment.
Figure 3B:
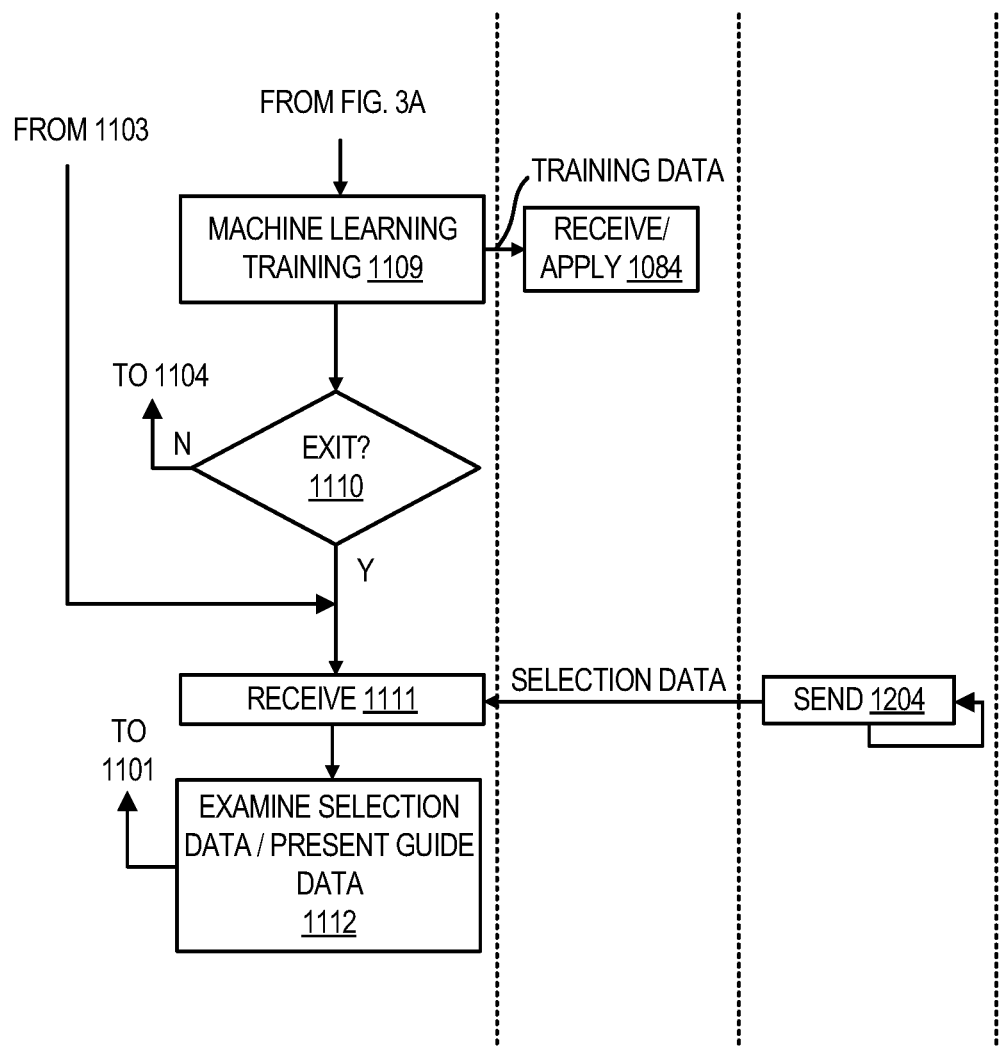

The flowchart of FIGS. 3A-3B illustrates a method for performance by manager system 110 interoperating with a client computer device 120A, data sources 2122A-2122Z, and data sources 140A-140Z.

At block 1101, manager system 110, e.g. in the background, can be iteratively performing examining of updates to dimensional hierarchies available from data sources 2122A-2122Z and data sources 140A-140Z and can be iteratively examining historical dimensional hierarchy change data stored in history area 2121 of data repository 108.

In response to the described examining, manager system 110 can perform automated action process 114 (FIG. 1) to provide automatic actions which can include, e.g. automatically updating of a dimensional hierarchy, and/or automatically prompting an analyst user to take action e.g. to implement an update to a dimensional hierarchy. Performance of block 1101 can include multiple data queries of data sources 2122A-2122Z and data sources 140A-140Z which are responded to by the respective data sources at block 1401, specified in the flowchart of FIG. 3A-3B as a query receive and respond block. Manager system 110 for performance of block 1101 can also perform multiple data queries of data repository 108 which are responded to by data repository 108 at block 1081, which is specified in the flow diagram of FIG. 4 as a query receive and respond block. Manager system 110 in response to completion of block 1101 can proceed to block 1102.

Manager system 110 at block 1102 can be receiving mode select data from a client computer device 120A. Client computer device 120A can be iteratively sending mode select data at block 1201 for receipt by manager system 110 at block 1102.

Figure 4:
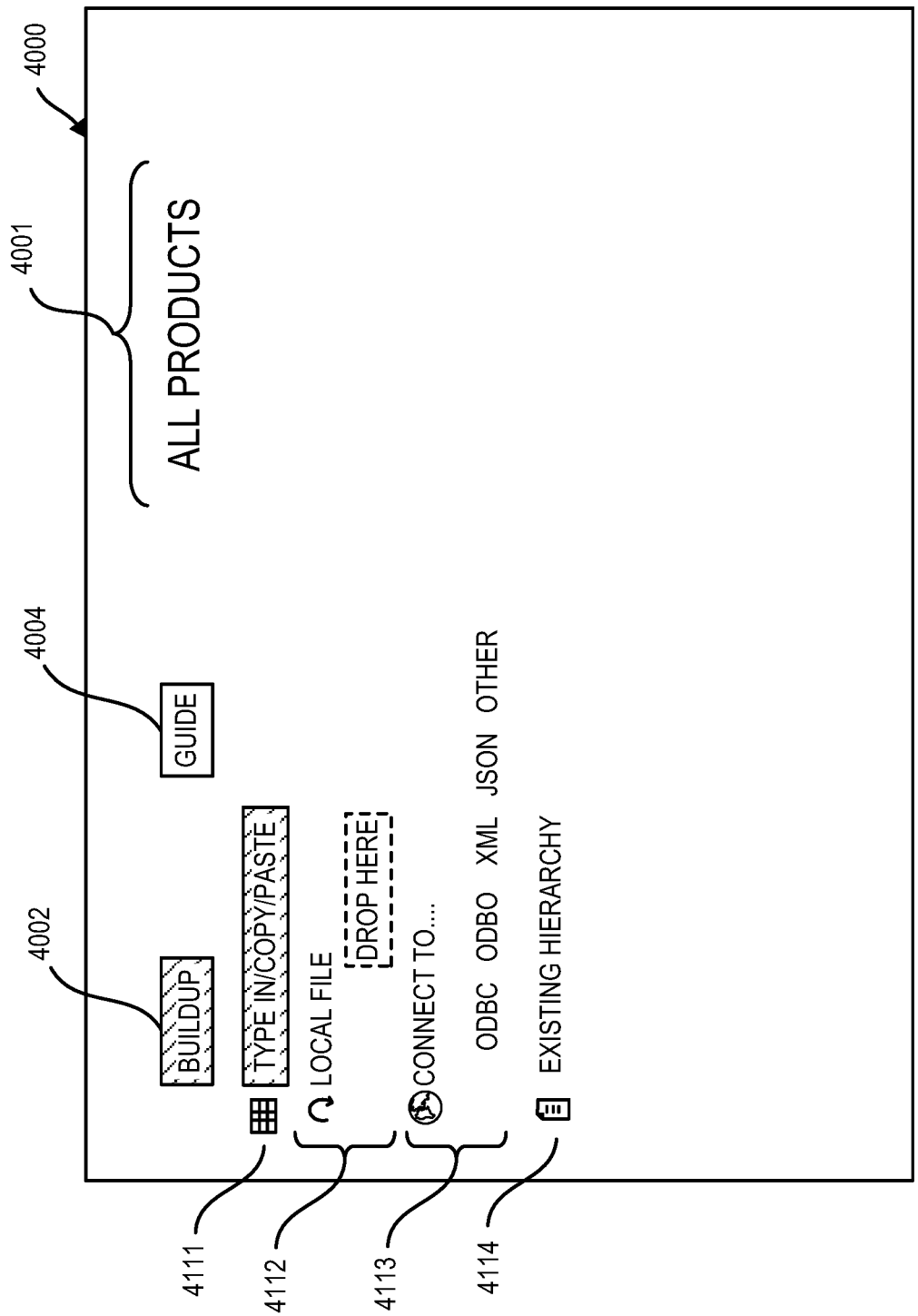
FIG. 4 illustrates an interactive user interface that can be displayed on a client computer device in various stages according to one embodiment.

Client computer device 120A can be displaying user interface 4000 as set forth in FIG. 4, which can be a displayed user interface. User interface 4000 can have a first area provided by a dimensional hierarchy display area 4001 and a second area provided by the left-hand side of user interface 4000 having various control interface element areas including e g active interface control buttons. Analyst user 119A can select between a buildup mode and a guide mode, with use of build mode interface control 4002 and guide mode interface control 4004 as shown in FIG. 4. At block 1103, with mode selection data received, manager system 110 can determine the selected mode. In response to the buildup mode being selected, manager system 110 can proceed to block 1104.

Display area 4001 can display a dimensional hierarchy. A dimensional hierarchy can be characterized by node members having associated node labels. A dimensional hierarchy can have a plurality of levels. Node members of a dimensional hierarchy can be organized under a root node member. A root node member can have one or more child members, which child members in turn can have one or more child member.

At block 1104, manager system 110 can be receiving change request data from client computer device 120A and client computer device 120A can be iteratively sending change request data for receipt by manager system 110 at receive block 1104.

Referring to FIG. 4, an analyst user using user interface 4000 can author a dimensional hierarchy with use of various user interface controls. With use of interface control element area 4111, an analyst user can select a configuration wherein an analyst user can author dimensional hierarchy data simply by typing in the data or copying and pasting from another source (original authoring). With use of interface control element area 4112 an analyst user can select a configuration wherein an analyst user can select for importation dimensional hierarchy data from a select one of data sources 2122A-2122Z which can be data sources external to a planning application mapping to local file directories. One file directory can store XLS files, for example, and one file directory can store CSV files for example. An analyst user using interface control element area 4113 can designate for selection importation of dimensional hierarchy data from a select one of data sources 140A-140Z which can be data sources external to a planning application. Data sources 140A-140Z can be remote data sources, according to one embodiment and can be provided e.g. ODBC, ODBO, XML, and/or JSON data sources. Analyst users using user interface control element area 4114 can toggle back to view data of an existing hierarchy being authored.

Data sources 2122A-2122Z and data sources 140A-140Z can be associated to user interface 4000 so that activating one or more control interface element of user interface 4000 by an analyst user facilitates access to data of a selected one or more data sources of data sources 2122A-2122Z and/or data sources 140A-140Z. User interface 4000 according to one embodiment can be defined by a common user interface window that commonly includes display area 4001 for displaying a dimensional hierarchy and interface control element areas 4111-4114 including one or more control element for accessing dimensional hierarchy data from one or more data source of one or more data sources 2122A-2122Z and/or data sources 140A-140Z.

Interface control element areas 4111-4114 can include active user interface control buttons activatable by a finger or pointer. The different text based words ODBC, ODBO, XML, JSON of control interface area 4113 of user interface 4000 can be configured as active control buttons associated to respective different ones of data sources 140A-140Z so that activating one of the control buttons accesses dimensional hierarchy data from one of the data sources. Likewise, control interface area 4112 can have text based words configured as active control buttons associated to respective different ones of data sources 2122A-2122Z so that activating one of the control buttons accesses dimensional hierarchy data from one of the data sources 2122A-2122Z.

Embodiments herein can include presenting prompting data displayed on user interface 4000 to guide an analyst user who is using user interface 4000 to author a dimensional hierarchy presented in display area 4001, the dimensional hierarchy for use by a planning application, wherein the presenting prompting data includes using historical change data of one or more analyst user with respect to the dimensional hierarchy. User interface 4000 can include according to one embodiment a dimensional hierarchy display area 4001 that displays a dimensional hierarchy being authored by a certain analyst user and a second area (left side of user interface) having control buttons (e.g. buttons of interface element area 4112 and interface control element area 4113) associated to respective different data sources having dimensional hierarchy content, wherein the user interface 4000 is configured to facilitate access to content of the respective different data sources with use of the control buttons.

Referring to FIGS. 4-7, an analyst user can be part of a team to define a new financial planning application for their enterprise. Analyst users can be asked to set up a new dimensional hierarchy for a product dimension. The analyst user can be aware that there are multiple data sources that can be used to create such a dimensional hierarchy.

For changing a dimensional hierarchy used by a planning system an analyst user can use a user interface 4000. The analyst user with reference to user interface 4000 as shown in FIG. 4 can give a dimensional hierarchy a name: ALL PRODUCTS, and having selected the type-in/copy-and-paste option using interface control element area 4111 the analyst user can type in dimensional hierarchy name for the dimensional hierarchy name: ALL PRODUCTS as shown in the righthand side of user interface 4000 shown in FIG. 4.

Figure 5A:
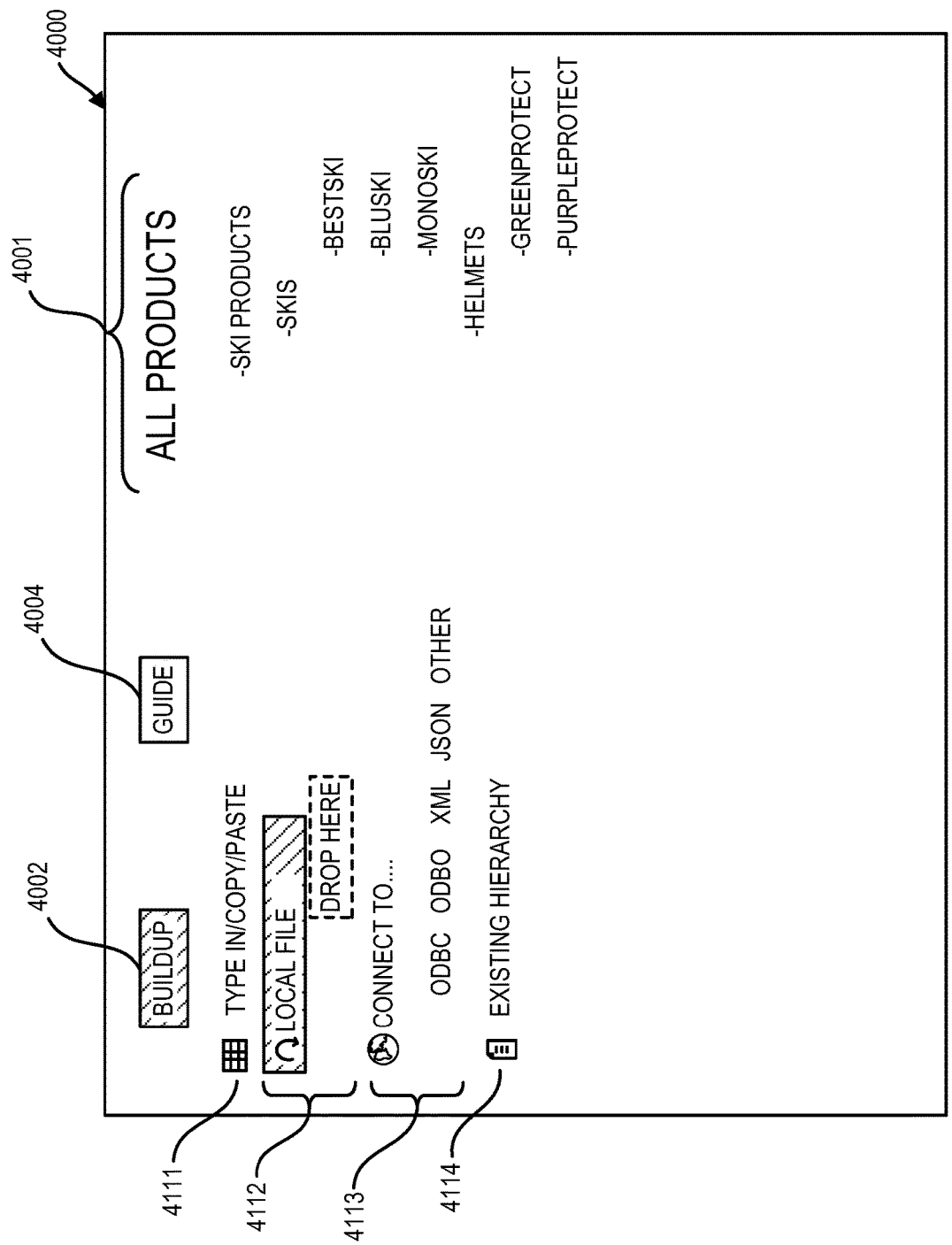
FIG. 5A illustrates an interactive user interface that can be displayed on a client computer device in various stages according to one embodiment.

Referring to the user interface of FIG. 5A the analyst user can also be aware that there is dimensional hierarchy data located in an XLS file stored in a local file directory for storing XLS files. Referring to FIG. 5A, the user can select the user interface control element area 4112 to select a desired XLS file. An analyst user can import a high level structure specifying a dimensional hierarchy for products from the selected XLS data source. The authored dimensional hierarchy can thus be updated to the form as depicted on the righthand side of FIG. 5A.

Figure 5B:
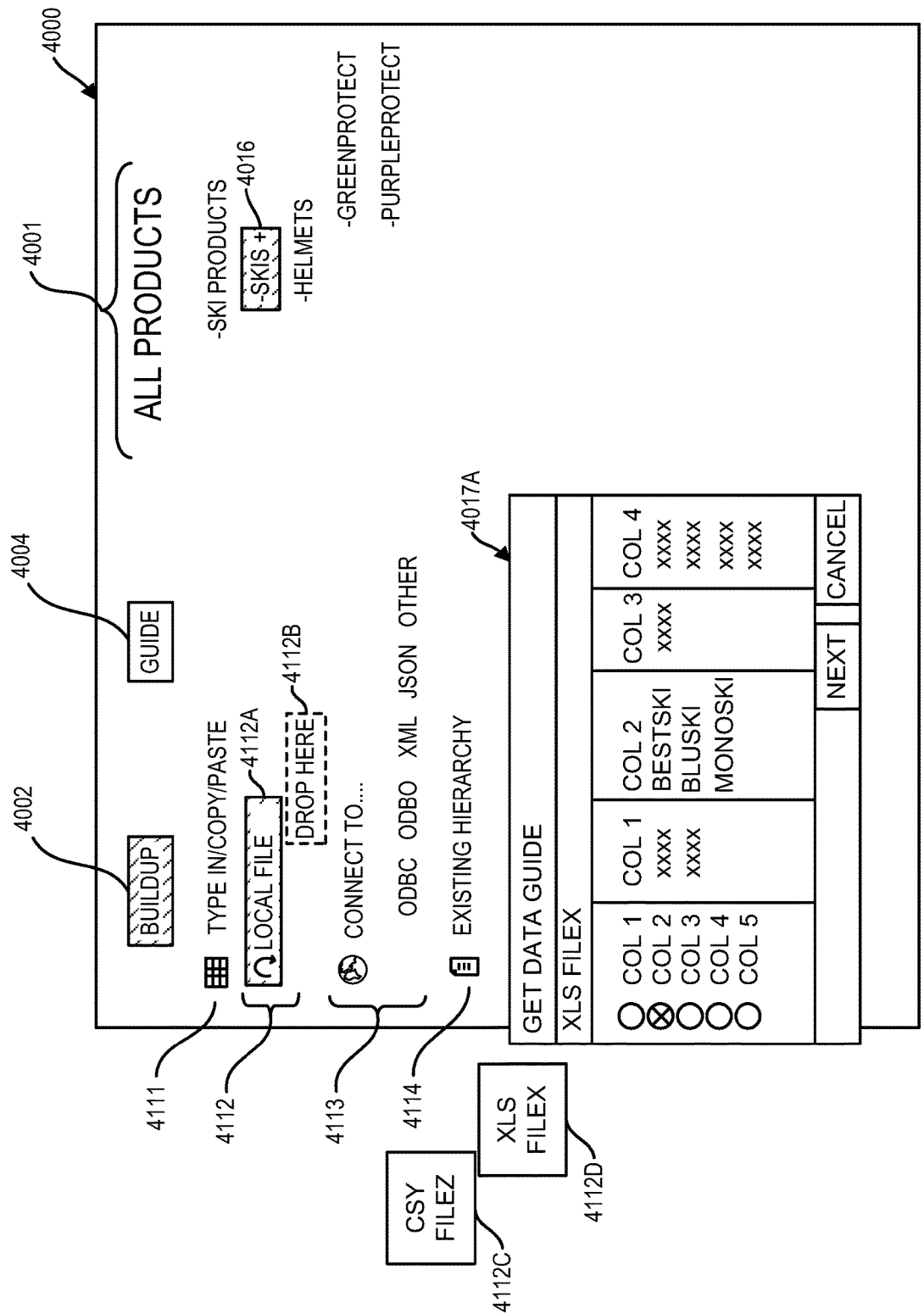
FIG. 5B illustrates an interactive user interface that can be displayed on a client computer device in various stages according to one embodiment.
Figure 5C:
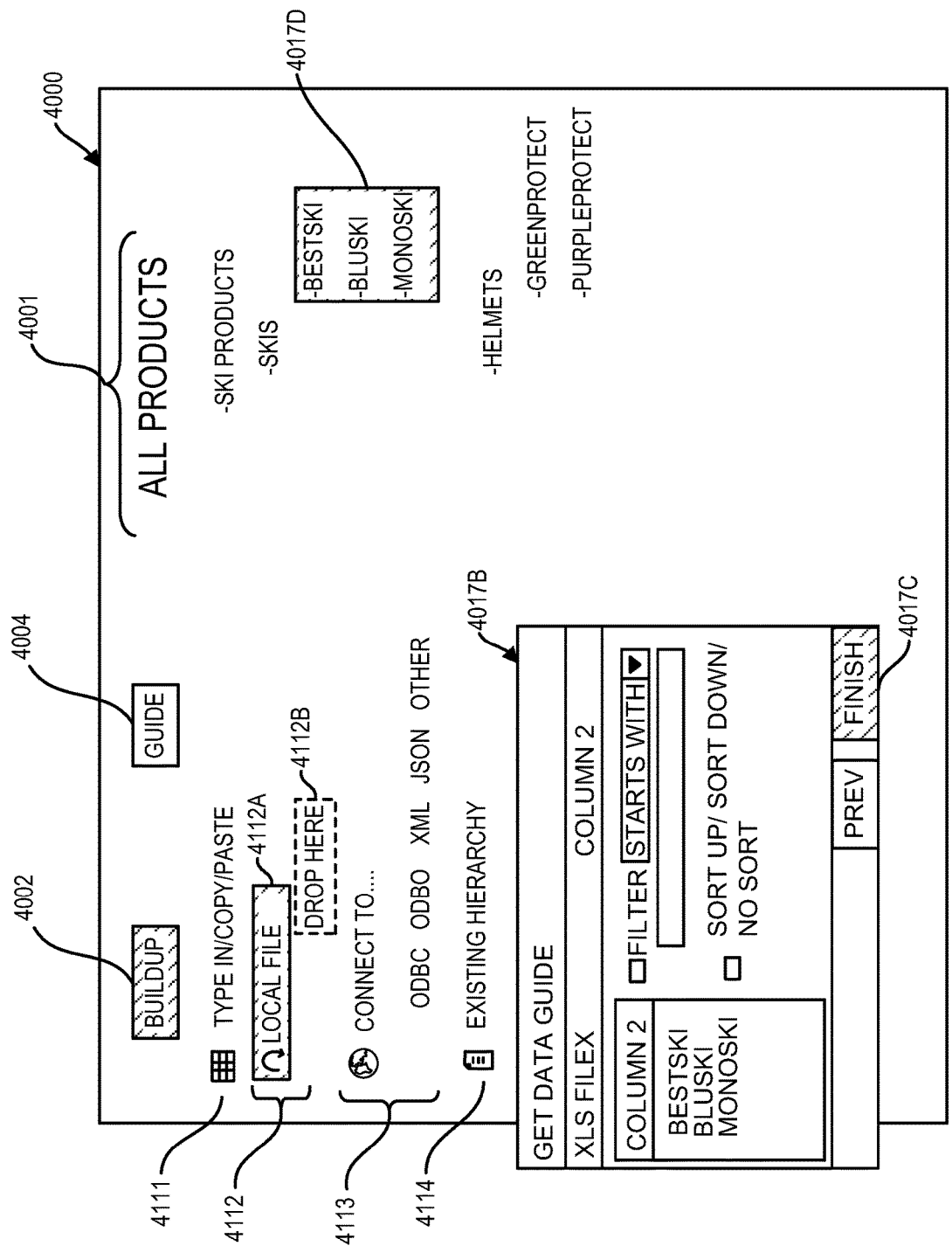
FIG. 5C illustrates an interactive user interface that can be displayed on a client computer device in various stages according to one embodiment.

In the described scenario described in reference to FIG. 5A, an analyst user according to one embodiment can access the three levels of the dimensional hierarchy indicated in FIG. 5A, under the root node member: ALL PRODUCTS. The dimensional hierarchy indicated in FIG. 5A includes four level of hierarchies in total and three levels of hierarchy under the root node member: ALL PRODUCTS. The three levels of hierarchy under the root node member according to one embodiment can be accessed as a group of members, e.g. from a single column within an XLS file, where the XLS file has the indentations depicted in FIG. 5A. According to another user case scenario the multilevel hierarchy depicted in FIG. 5A can be built up in stages with use of user interface 4000 by an analyst user. FIGS. 5B and 5C depict iterative buildup of the dimensional hierarchy depicted in FIG. 5A according to one embodiment.

Referring to FIG. 5B, dimensional hierarchy of area 4001 can be in an earlier stage than as depicted in FIG. 5B with a node member "SKI PRODUCTS" having the child members "SKIS" and "HELMETS". User interface 4000 can be configured so that by right-clicking the SKIS node member, highlight 4016 is depicted with a plus sign (+) adjacent to the text describing the member. Clicking on the plus sign (+) can indicate the intention to add child members under the node member. With the highlight 4016 active, one or more control element of area 4112 can be activated. For example, on right-clicking the text local file highlight 4112A can be presented, in some cases, e.g. with a dropdown menu specifying previously associated CSV and/or XLS files. Clicking actions associated to a pointer controller as set forth herein with reference to any part of the present disclosure can be substituted for by finger press actions, e.g. as in a touch sensitive display.

User interface 4000 can be configured to allow an analyst user to associate new CSV and/or XLS files, e.g. using dropbox 4112B. User interface 4000 can be configured so that an analyst user can drag and drop an icon specifying a CSV and/or XLS file for association with user interface 4000 by dragging and dropping into dropbox 4112B. For example, an analyst user can drag and drop one or more of CSV file icon 4112C or XLS file icon 4112D into dropbox 4112B. The icons 4112C and 4112D can be displayed, e.g. on a home screen, a displayed desktop directory, or in one or more windows for other non-desktop directories. When an icon specifying an CSV or XLS file is dragged and dropped into dropbox 4112B, manager system 110 can associate the new file to user interface 4000.

One characterizing feature of an associated data source can be the feature that user interface 4000 guides a user to select a subset of content of the data source for populating a dimensional hierarchy being built up using area 4001. For example, on dropping icon 4112D into dropbox 4112B get data guide window 4017A of user interface 4000 can be displayed. User interface 4000 can include a primary window such as shown in FIG. 5A and can include one or more guide window 4017A, 4017B, 4019A, 4019B, 4019C, 4019D as set forth herein defining a sub window of a primary window (FIG. 5) of user interface 4000.

Guide window 4017A can include a viewer that presents content of various columns within the selected CSV and/or XLS file or other selected file of another file format. Guide window 4017A can include a menu permitting an analyst user to select one column of a selected data source file. On selection of a column guide window 4017B can be displayed as depicted in FIG. 5C. Guide window 4017B as shown in FIG. 5C can include features to facilitate establishing of functions with respect to a selected column for use in populating a dimensional hierarchy. Functions can include, e.g. filtering functions and/or sorting functions. An analyst user using guide window 4017B can establish filter functions that filter data from a selected column so that not all data from the selected column is imported to a designated location of a dimensional hierarchy being authored. Other selections can include, e.g. starts with, ends with, contains, does not contain, etc. Sort functions that can be selected can include, e.g. sort down or no sort. When designation, selected filed, and any functions is complete an analyst user using window 4017B can activate finish button 4017C of guide window 4017B. On the activation of button 4017C user interface 4000 can display highlight area 4017D depicting the new members added to a dimensional hierarchy being authored using prompting data defining guide data such as guide window 4017A and guide window 4017B.

According to the one embodiment, the process of importing data from an XLS data source or CSV data source can include an analyst user selecting with use of prompting data defining guide data presented on user interface 4000 the column of interest in some embodiments with selection of a sheet of interest. The selected column can be stored as a reference defining a data source parameter value. A data source parameter value can include e.g. a data source reference that includes e.g. data source name, directory and/or URL, sheet specifier, and column specifier. An XLS or CSV data source can include flat data (not organized by hierarchy) and/or hierarchical data (organized by a hierarchy).

Figure 6A:
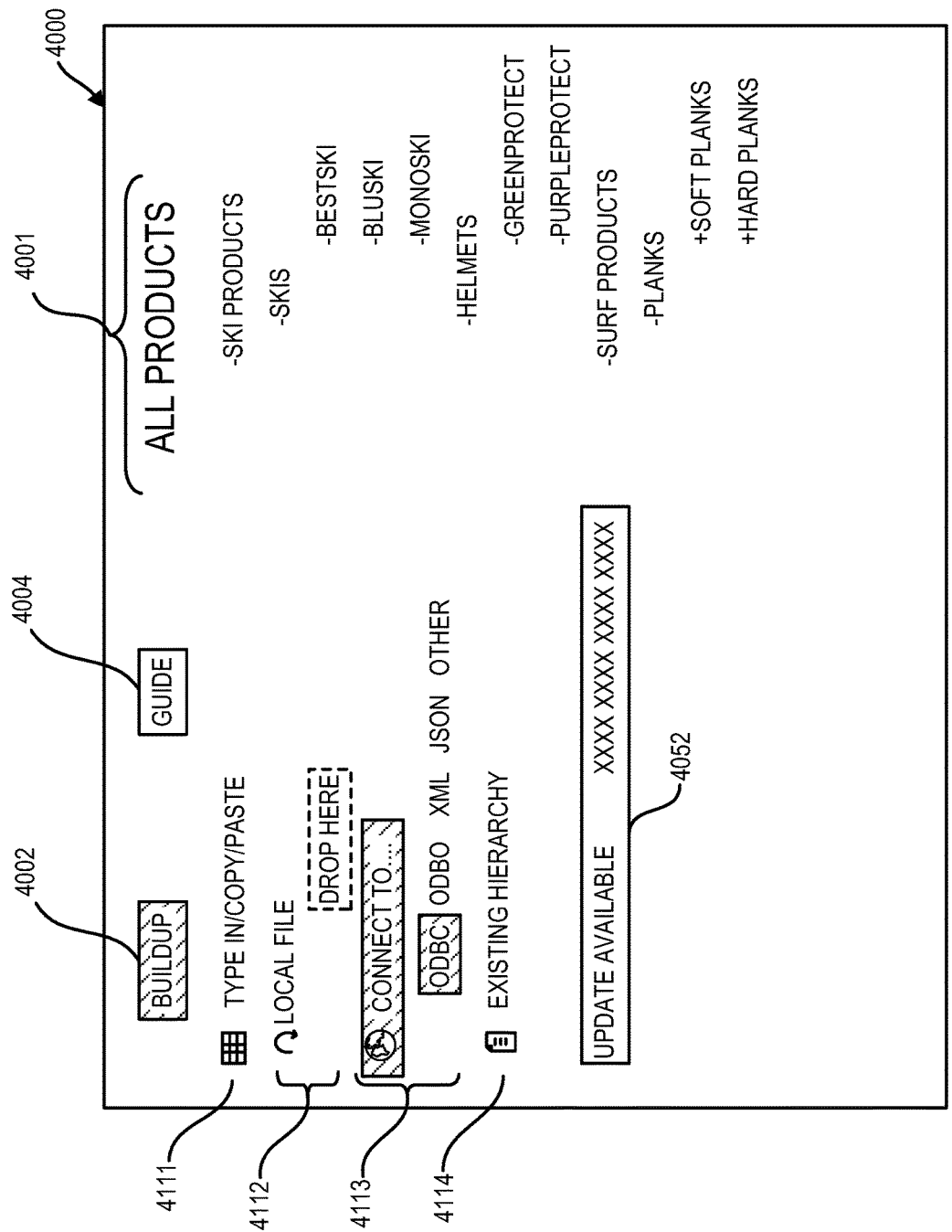
FIG. 6A illustrates an interactive user interface that can be displayed on a client computer device in various stages according to one embodiment.

The analyst user can also be aware that a dimensional hierarchy for one of the product lines is located in an ODBC data source such as data source 140A. Referring to FIG. 6A, analyst user can use user interface control element area 4113 to select the noted ODBC data source, e.g. by clicking on the words ODBC where the text based word is configured as an active control button. The analyst user can connect a node from a text based dimensional hierarchy of FIG. 6A to the ODBC data source and the resulting dimensional hierarchy can be updated to the form as shown in FIG. 6A.

Using user interface 4000, an analyst user is able to select a node in the dimensional hierarchy being authored or add a new node into a specific location in the dimensional hierarchy. There are different mechanisms that can be used, e.g. in one embodiment an analysist right-mouse click on an existing node and invoke "add new node". From any selection in the dimensional hierarchy, the user can invoke "Connect to . . . " (area 4113) and an analyst user can be prompted to select the data source of their interest. If it is an ODBC data source, they will go through steps to select the specific column of interest. Once confirmed e.g. with use of a "finish" button, the new data will be added to the dimensional hierarchy being authored (area 4001). Clicking actions associated to a pointer controller can be substituted for by finger press actions, e.g. as in a touch sensitive display.

Referring to FIG. 6A, four levels of hierarchy can be selected from an ODBC data source according to the scenario depicted in FIG. 6A. The four levels of hierarchies can include the parent node member: SURF PRODUCTS having the child node member: PLANKS and the child node member PLANKS being the parent node member with two child node members: SOFT PLANKS and HARD PLANKS and the node members SOFT PLANKS and HARD PLANKS having in turn child members thereunder.

According to one scenario the node members including and under SURF PRODUCTS as shown within area 4001 of FIG. 6A can be selected all at once as a group from a selected data source selected using area 4113 such as an ODBC data source. According to another embodiment, the node members including and under SURF PRODUCTS as depicted under area 4001 can be selected with use of one or more stages. An exemplary depiction of a selection stage is described in reference to FIGS. 6B and 6C.

With reference to FIG. 1, system 100 in one embodiment can include a single data source of each of the data source types ODBC, ODBO, XML, JSON, associated to user interface 4000. According to another embodiment there can be provided in system 100 more than one data source of at least one of the depicted data source types.

Figure 6B:
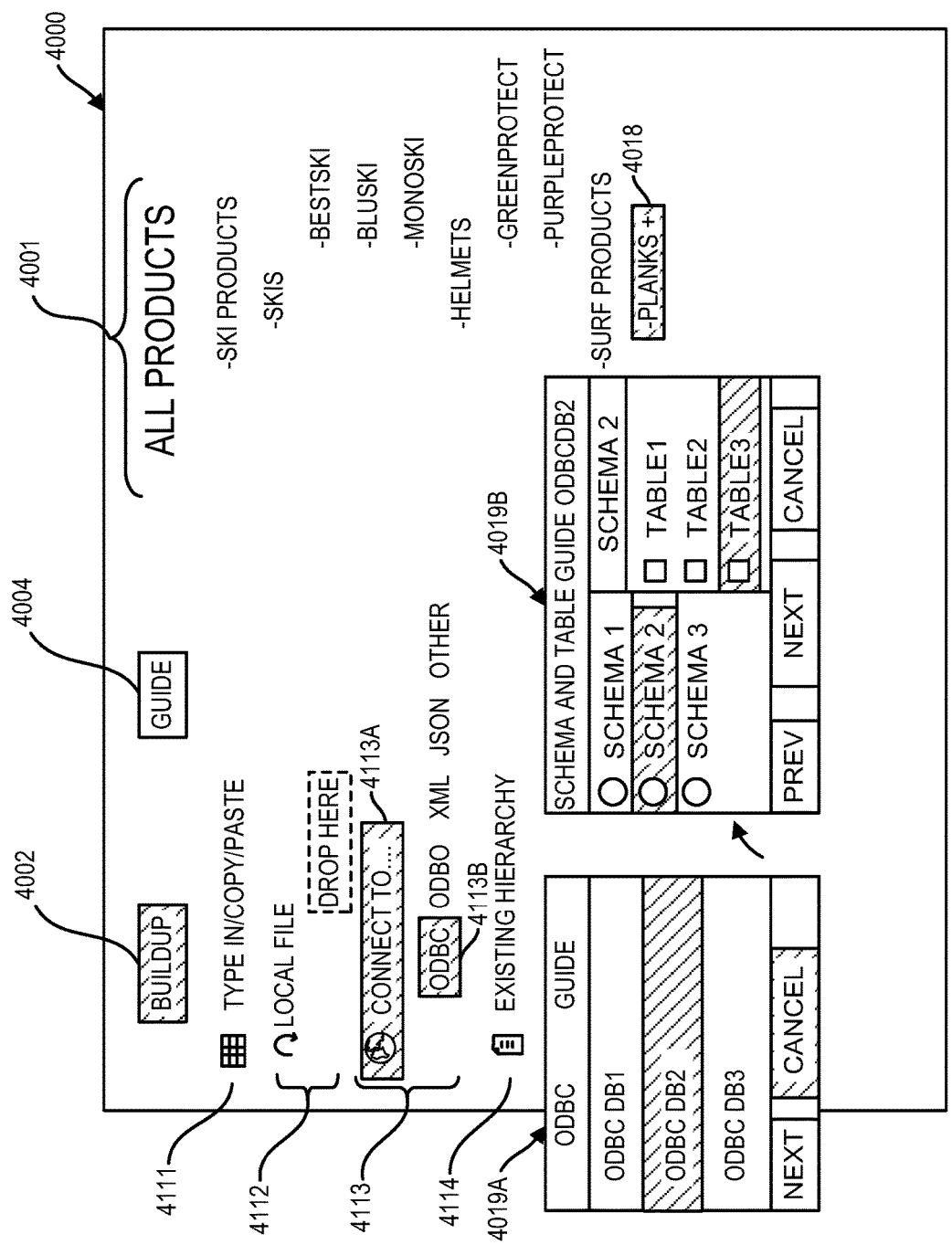
FIG. 6B illustrates an interactive user interface that can be displayed on a client computer device in various stages according to one embodiment.

Referring to FIG. 6B, the dimensional hierarchy being authored can be as depicted under area 4001 with node member PLANKS authored under the parent node member SURF PRODUCTS. With the dimensional hierarchy depicted as shown in FIG. 6B, an analyst user can, e.g. right-click the text describing the PLANKS node member and highlight 4018 can be responsively presented with a plus sign (+) presented adjacent to the text PLANKS. An analyst user can click on the plus sign (+) to designate the analyst user wishes to author one or more child node member under the PLANKS parent node member. With highlight 4018 active, an analyst user can click on the connected to text and ODBC text of area 4113 to activate highlights 4113A and 4113B. Thus, designating that an ODBC data source has been selected for use in the importation of one or more child node member under the PLANKS node member highlighted by highlight 4018. Where system 100 has more than one ODBC data source associated to user interface 4000, user interface 4000 can display guide window 4019A on the activation of highlight 4113B. Guide window 4019A allows an analyst user to select a certain ODBC database our of a candidate pool of ODBC databases. Using the prompting data defining guide data provided by guide window 4019A for example, an analyst user can select the ODBC database designated as ODBC2. With a certain ODBC data source selected, user interface 4000 can automatically display guide window 4019B.

Figure 6C:
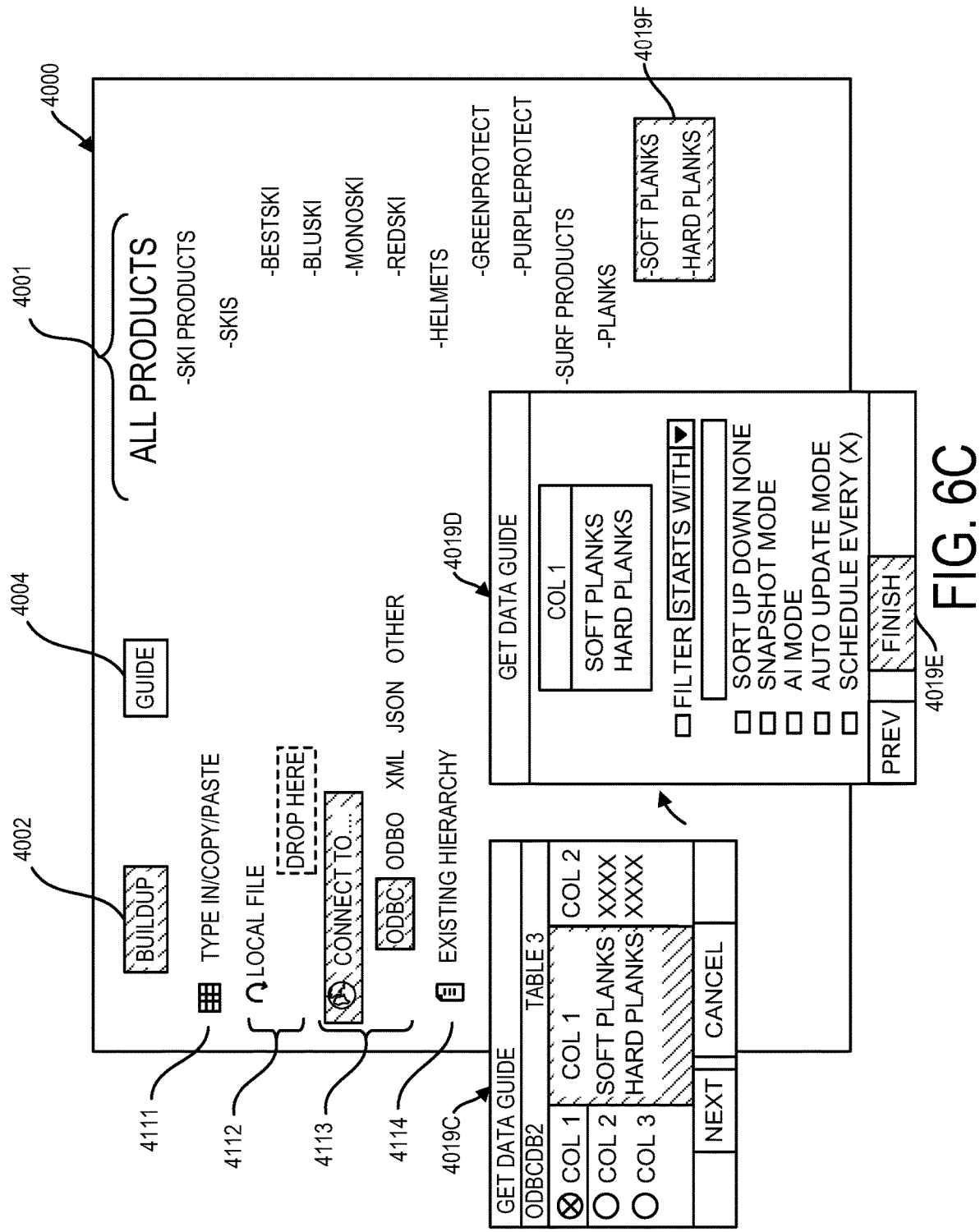
FIG. 6C illustrates an interactive user interface that can be displayed on a client computer device in various stages according to one embodiment.

Guide window 4019B can facilitate selection of a schema and a table by an analyst user. With a schema selected, e.g. schema 2, various tables under the selected schema can be presented in a window allowing an analyst user to select a certain table associated with a selected schema, e.g. table 3, in the described example. An analyst user can activate the "next" button of guide window 4019B to activate guide window 4019C as depicted in FIG. 6C.

Prompting data can define guide data provided by guide windows set forth herein. Guide window 4019C guides an analyst user to select a certain column within a certain selected table selected with user of guide window 4019B. With a certain column selected with use of the guiding functionality provided by guide window 4019C, guide window 4019D can be presented on user interface 4000.

Guide window 4019D allows an analyst user to establish various functions associated with a selected column of a selected table. Functions that can be selected can include a filter selection which operates in the manner described with reference to guide window 4017B and a sort function which operates in the manner described with reference to guide window 4017B. Guide window 4019D can present additional configuration options such as options to select a snapshot mode, an AI mode, and an auto-update mode, with an option to select a schedule for update when the auto-update mode is selected. When a snapshot mode is selected using guide window 4019D manager system 110 can be configured so that selected data from a selected column selected with use of guide window 4019C is simply ported to a designated area of a dimensional hierarchy being authored without recording of a reference to the selected column location of the selected data source. When an AI mode is selected, manager system 110 can be configured to perform update processes that employ predictions as to whether an analyst user will implement an available update, e.g. using features described in connection with Eq. 1 as set forth herein. The AI mode can also be activated by default in the absence of another selection. When the auto-update mode is selected, manager system 110 can be configured to automatically update a dimensional hierarchy being authored using area 4001 in accordance with updates that are available within a data source used for populating content of the dimensional hierarchy being authored. An analyst user using guide window 4019D can select a schedule by which updates available within a data source selected using guide windows 4019A and 4019B and 4019C are available. Completion of selections made with use of guide window 4019D, an analyst user can activate finish button 4019E to indicate that a selection has been finished, whereupon highlight 4019F can be displayed highlighting newly populated node members of a dimensional hierarchy being authored just added with use of guide windows 4019A, 4019B, 4019C, and 4019D.

The selections associated to guide window 4019D (filter, sort, snapshot, AI mode, auto-update, schedule) can be recorded into a change request record as set forth herein. The recorded data can be later queried by manager system 110 for generation of prompting data as set forth herein e.g. in connection with block 1106 and/or Table A. Guide window 4017B can be configured so that all of the analyst user selections available with use of guide window 4019D are with available with user of guide window 4017B so that an analyst user using guide window 4017B can specify selection data so that a change to a dimensional hierarchy being authored using a selected data source selected using area 4112 is automatically updated in dependence on updates being determined to be available at the data source.

Figure 7:
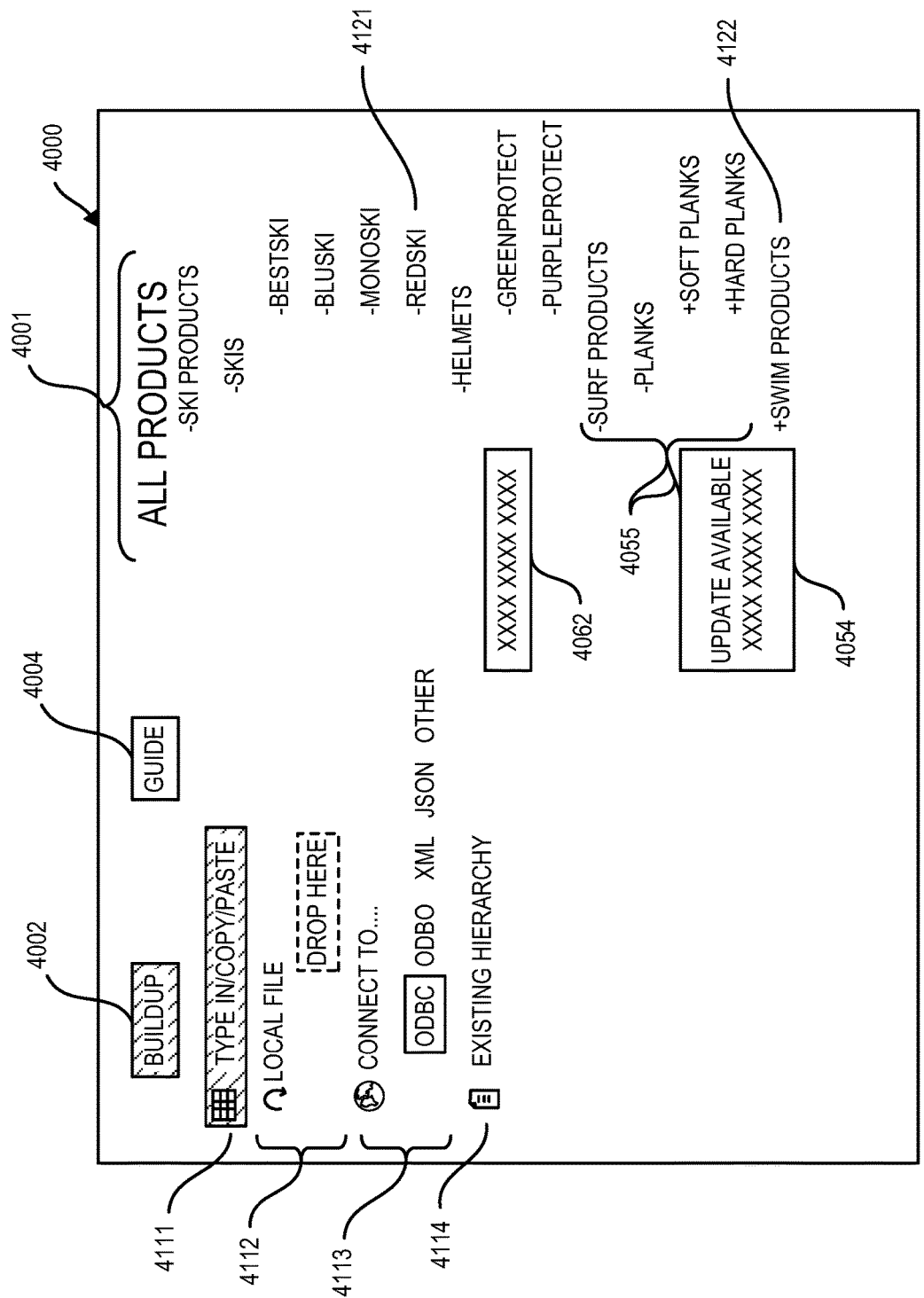
FIG. 7 illustrates an interactive user interface that can be displayed on a client computer device in various stages according to one embodiment.

Referring to user interface 4000 as shown in FIG. 7, an analyst user can be aware of additional products through resources not associated to user interface 4000, e.g. may be verbally advised of a new product or product line at a meeting. Referring to FIG. 7, the analyst user can select a type-in or copy-and-paste (manual original authorship) configuration using interface control element area 4111 to activate again the type-in or copy-and-paste (manual original authorship) option. As shown in FIG. 7, the analyst user can add at area 4121 a new child member REDSKI under the SKIS parent node member and at area 4122 can add to the product line SWIM PRODUCTS under the root node member ALL PRODUCTS. As indicated by the plus (+) sign associated to the product line SWIM PRODUCTS. Product line SWIM PRODUCTS can have a plurality of child nodes currently hidden from view in user interface 4000 as depicted in FIG. 7.

Referring to FIGS. 4-7 an analyst user can change and replace parts of the dimensional hierarchy that come from different sources and the analyst user can open the dimensional hierarchy to see added members of the hierarchy. User interface 4000 as shown in FIGS. 4-7 can permit an analyst user to perform numerous options, including: (a) removing a whole block of members directly and moving it to another hierarchy; (b) identifying a block of members content by typing in new data; (c) embedding updates via configuration settings so that a block of node members of a dimensional hierarchy is automatically updated when the data source from which it was imported is updated; and (d) replacing a block of multiple node members at once.

According to a feature set forth herein, an analyst user can use user interface 4000 to access multiple different data sources that have dimensional hierarchy data, e.g., with user interface control element area 4112 and interface control element area 4113, which can be, e.g. finger and/or pointer activated. System 100 can have various features that allow access to dimensional hierarchy data of various different data sources using user interface 4000, wherein the data sources have been associated to user interface 4000.

Copy and paste action to build a dimensional hierarchy using area 4111 of user interface 4000 can be differentiated from action that can occur when associated data sources associated to user interface 4000 are used to build a dimensional hierarchy. According to one embodiment, copy and pasting may not create reference to the original data source, while use of an associated data source selected using area 4112 or area 4113 can result in a recorded change request record that includes a reference to data source including a reference to a location of the data source. Users can copy and paste their members from anywhere, but the dimensional hierarchy members can remain the same until the analyst will explicitly edit/remove these values. Manager system 110 can tag originally authored node members as such (with its own block indicator), so that the analyst user e.g. using user interface 4000 in a state depicted in FIG. 8 or FIG. 9 knows that there were in fact entered "manually".

When there is use of an associated data source to author a dimensional hierarchy e.g. using area 4112 or area 4113, manager system 110 can create a fixed reference to selected data of the associated data source. The fixed reference can be recorded by manager system 110 in a change request record. The connection to the associated data source associated to user interface 4000 according can be regarded to be "hard-wired" in that if the data source is updated, also the member blocks in the dimensional hierarchy being authored can be updated automatically e.g. without any action from the analyst user or in response to an analyst user confirming action specified in a prompt. The reference to a certain location of a data source within a change request record can be used at runtime, when the members are called upon for usage in a planning system.

According to one embodiment, ODBC refers to a data source that can be frequently updated, so that the hierarchy is iteratively reflecting the latest data in the data source. Updating can be performed e.g. every 10 minutes, every hour, every day, every week, without an analyst user needing to perform manual action to update the dimensional hierarchy.

User interface 4000 can be configured so that if an analyst user connects a block of members within the hierarchy with a specific data source (or just uses copy-and-paste or type-in), so that updates to the set of members is automatically performed, but also so that the user can replace the type of data source at that location in the hierarchy e.g. if the user wants to change a block of members and wants to use another data source, they can do that by selecting the block of members and replacing all these members at once based on the new data source. The blocks are used to differentiate the different data origins and the different member groups, so that the analyst can replace these blocks with other data or edit it if they are manually entered.

Inputs of an analyst user into user interface 4000 for authoring a dimensional hierarchy including making changes to dimensional hierarchy can define change request data. Change request data can include, e.g., (a) data defining selection of the type-in or copy-and-paste change configuration; (b) data defining selection of an associated data source associated to user interface 4000 source, (c) data defining deletion of a node member block from a dimensional hierarchy; (d) data defining reordering of a node member block in a dimensional hierarchy; (e) data defining addition of node member block into a dimensional hierarchy. The type (e) change request data can be further species as (i) single level node block additions, (ii) two level node member (i.e. parent and child node members) block additions, (iii) three level node member (i.e. grandparent, parent and child) block additions, and so on. Node member block herein can include one or more node members.

With reference again to the flowchart of FIGS. 3A and 3B, manager system 110 at block 1105, while an analyst user is making changes to a dimensional hierarchy displayed in text and/or graphics in dimensional hierarchy display area 4001 can be examining received change request data for return of parameter values associated to the change request data. Parameters for which change request parameter values can be returned can include, e.g. (i) data source parameter value; (ii) a change classifier parameter value; (iii) a node specification parameter value; (iv) a change description parameter value; (v) a time-stamped parameter value; and/or (vi) a user ID parameter value. Specified data source can specify the data source selected by the analyst user, e.g. data sources 2122A-2122Z and/or data sources 140A-140Z, which can be selected by analyst user with use of interface control element area 4112 or interface control element area 4113.

Where the data source from which content of a dimensional hierarchy being authored has been selected by an analyst user is a data source that has been associated to user interface 4000, the data source parameter value can include a reference to a certain location (e.g. column location, column location and sheet location) within the data source from which the content has been selected. Manager system can 110 can record in a change request record function specifying data specifying functions (e.g. filter function, sort functions) associated to the certain location which have been established by the analyst user in the manager described with respect to guide window 4017B and guide window 4019D (FIG. 6C). Manager system 110 can later use data of a recorded change request data record to perform an automatic update of the dimensional hierarchy being authored in response an update of data at the certain location of the associated data source. The automatic update can be performed by manager system 110 e.g. in response to a user input prompted for by prompting data presented by manager system 110 or without any analyst user input.

Regarding (i), the data source parameter value can be specified as "originally authored" when interface control element area 4111 is selected to facilitate original authorship of node members by an analyst user. Regarding (i), the data source parameter value can otherwise can specify a location of an associated data source from which content was selected for inclusion into a dimensional hierarchy being authored.

Regarding the change classifier parameter value (ii), manager system 110 can examine received change request data to identify a classification of a change request, e.g. whether the change request relates is a node member block addition change request, a node member block deletion change request, a node member replacement request, or a node member block reordering request. Node member addition requests can be specified e.g. as (a) single level node block additions, (b) two level node member (i.e. parent and child node members) block additions, (c) three level node member (i.e. grandparent, parent and child) block additions, and so on. Node member blocks herein can include one or more node members.

Regarding (iii), the node specification parameter value, manager system 110 can identify node specification data for a specified change request, e.g., can identify the member node order, e.g., the order in the hierarchy, of an added member block or deleted member block and can include with the node specification data text data specifying the node labels.

Manager system 110 for return of (iv) change description parameter values can specify additional descriptive content e.g. text based content in respect to a change request.

Manager system 110 for return of time-stamped parameter value (v) can identify a system time of manager system 110 associated with the receipt of change request data and can attach that time to a change request data record.

Manager system 110 for return of (vi) a user ID parameter value can identify an identifier associated to a currently logged-in analyst user and can attach that user identifier to a change request data record.

Manager system 110 at block 1106 can examine history data of history area 2121 in dependence on received change request data and can responsibly generate prompts. Manager system 110 performing block 1106 can include iterative queries. Manager system 110 performing iterative queries of data repository 108, which can be responded to by data repository 108 at query received respond block 1082. Manager system 110 at block 1107 can acquire change data from data sources specified with change request data, including a data source of data sources 2122A-2122Z and/or data sources 140A-140Z.

Manager system 110 performing acquire change data at block 1107 can include manager system 110 importing a specified block of dimension hierarchy data from a specified associated data source into the data defining the dimensional hierarchy currently being authored by an analyst user. According to one embodiment, one difference between the direct importation of hierarchy data and a copy-and-paste action is that in the importation of data with use of an associated data source associated to user interface 4000 manager system 110 can create a reference to the original data source, so that for update of the dimensional hierarchy being authored manager system 110 can query for the latest member from the referenced location of the data source, e.g. column in that connected data source. Copy-and-paste can result in a "hard-coded" (rather than a "hard wired") set of members, which can remain the same over time notwithstanding updates at associated data sources associated to user interface 4000, unless the analyst explicitly edits the values.

Manager system 110 performing acquire change data at block 1107 can include manager system 110 populating the imported dimensional hierarchy data into a current planning application file having a current dimensional hierarchy being authored by an analyst user. Manager system 110 performing block 1107 can include manager system 110 presenting the newly-imported hierarchy data from a data source for presentment in dimensional hierarchy display area 4001 as part of the dimensional hierarchy being authored. For example, with reference to FIG. 6, the last four node member blocks comprising the last four node members as specified in dimensional hierarchy display area 4001 of FIG. 6, specified by the change request described in connection with FIG. 6 can be automatically displayed as part of the dimensional hierarchy display area 4001 of user interface 4000 depicted in FIG. 6 in response to an analyst user performing the change request action involving use of interface control element area 4113 of user interface 4000.

Referring further to the flowchart of FIG. 3A, Manager system 110 at block 1105 can generate a data record that specifies attributes of a change request for changing a dimensional hierarchy. A generated change request record can be an interim record for change request in progress or can be a record for a completed and finalized change request. Manager system 110 at block 1105 can generate a dimensional hierarchy change record that specifies changes to a dimensional hierarchy. It can be seen with reference to the flowchart of FIG. 3 that block 1105 can be performed iteratively. According to one embodiment, the change request record generated at block 1105 can be iteratively updated over time as an analyst user may be altering attributes of a current change being defined. For example, an analyst user can be tentatively selecting a first data source and then switching to another data source or initially designating change within a first location of a dimensional hierarchy and then switching to a next location and so on. A succession of interim change request data records can be generated while manager system 110 iteratively performs the loop including block 1105, 1106 and block 1107.

In response to completion of block 1107 manager system 110 can perform block 1108 to record change data into data repository 108 in history area 2121.

According to one embodiment, performance of manager system 110 of block 1108 can be preconditioned on manager system 110 confirming that a dimensional hierarchy change has been completed by an analyst user for performance of a determination of whether a change has been complete at block 1108. Manager system 110 can examine currently received change request data. For example, according to one embodiment, each change request can include an associated ordered list of actions that can be completed by an analyst user for implementing a change to a dimensional hierarchy involving such ordered steps as initially setting selecting a change configuration identifying with user interface action a node location of a dimensional hierarchy affected and finally a termination indicating user interface action. For example, just prior to finalization of a changed area of a displayed dimensional hierarchy can be displayed with a different highlight inviting an analyst user to confirm the change in such an example a double click by an analyst user can define a termination action terminating change request definition activity. One example of a termination action can be an analyst user clicking on a finish button 4017C (FIG. 5C), 4019E (FIG. 6C).

Manager system 110 at block 1108 can examine change request data defining a termination action and in response to identification of such change request data can store a change request data record in its currently generated state into data repository 108 at block 1101. Manager system 110 at block 1108 in response to receipt and identification of change request data defining a termination action can send a change request record in its current state for storage into storage memory location of data repository 108 at block 1083. Data repository 108 at block 1083 can responsively store a change request record in its currently generated state into a storage memory location history area 2121 of data repository 108. Prior to storage of change request record into history area 2121 the change request record for a current change in its prior iterative states can be stored, e.g. in a buffer memory location defined, e.g. in an in memory storage location of history area 2121 of data repository 108. With a dimensional hierarchy change request record stored with blocks 1108 and 1083 into history area 2121 there can be stored change data, i.e. underlying change data provided by the dimensional hierarchy data originally authored by the user in an original authorship change configuration or the received dimensional hierarchy data received at block 1107 from a data source. In storing a dimensional hierarchy change request record with change data, manager system 110 can associate and tag the change data with the change request record so that the change request record is associated to the change data.

Thus, history area 2121 can store a complete record of all changes to a dimensional hierarchy authored over time by one or more analyst user, including originally authored content or imported dimensional hierarchy content. The change request data record associated with dimensional hierarchy change data stored in history area 2121 can include the parameter values specified in connection with block 1105. The parameter values can include e.g. (i) data source; (ii) change classifier; (iii) node specification; (iv) change description; (v) timestamp; and/or (vi) user ID. On completion of block 1108, manager system 110 can proceed to block 1109.

Where the data source from which content of a dimensional hierarchy being authored has been selected by an analyst user is a data source that has been associated to user interface 4000, the data source parameter value can include a reference to a certain location (e.g. column location, column location and sheet location) within the data source from which the content has been selected. Manager system 110 can record in a change request record function specifying data specifying functions (e.g. filter function, sort functions) associated to the certain location which has been selected by the analyst user in the manager described with respect to guide window 4017B and guide window 4019D (FIG. 6C). Manager system 110 can later use data of a recorded change request data record to perform an automatic update of the dimensional hierarchy being authored in response an update of data at the certain location of the associated data source. The automatic update can be performed by manager system 110 e.g. in response to a user input prompted for by prompting data presented by manager system 110 or without any analyst user input.

Figure 6D:
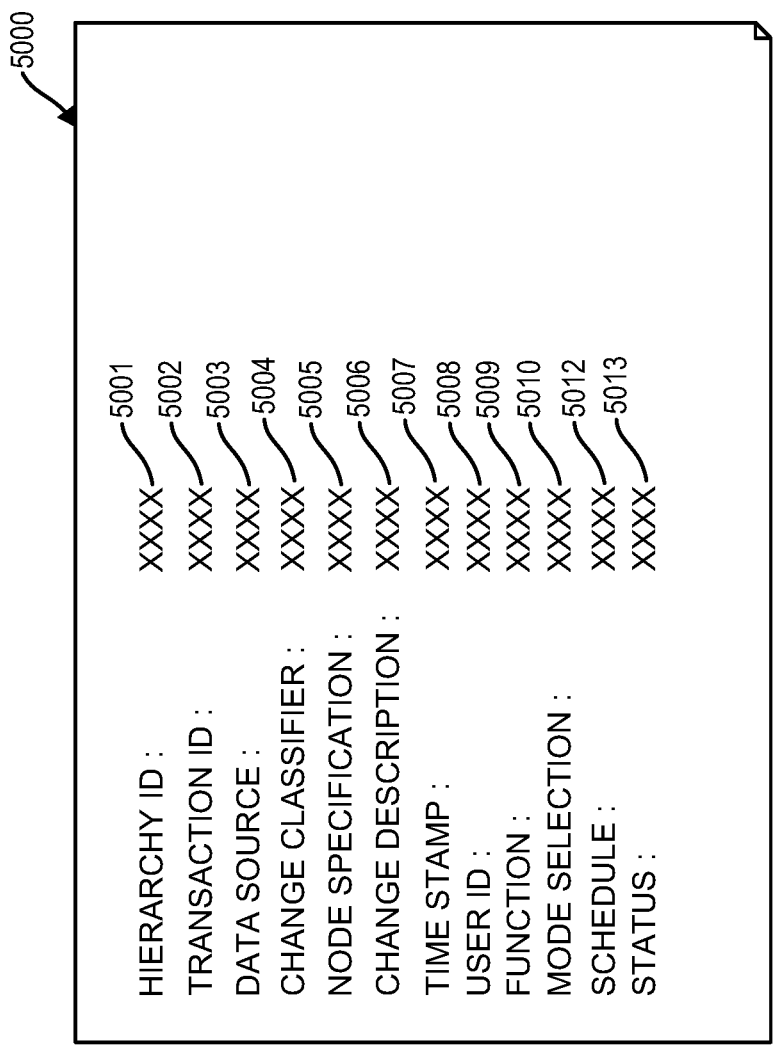
FIG. 6D depicts a change request record according to one embodiment.

FIG. 6D depicts a change request record 5000 that can be recorded by manager system 110 for each change request defined by an analyst user. A change request record can include e.g. hierarchy ID data 5001 specifying an ID of a dimensional hierarchy being authored, transaction ID data 5002 specifying an ID for the change request, data source data 5003 specifying a data source which can include e.g. a location within a data source, change classification data 5004, node specification data 5005, change description data 5006, timestamp data 5007, analyst user ID data 5008, function specifying data 5009 as specified by an analyst user in a manner explained with reference to guide window 4017B, and guide window 4019D, mode selection data 5010 as specified by an analyst user in a manner explained with reference to guide window 4019D (specifying selections e.g. of auto update mode, AI mode, and schedule data as specified by an analyst user) in a manner explained with reference to guide window 4019D. Change request record 5000 can also include schedule data 5012 that specifies a schedule for updates according to data entries of an analyst user using area 4019D. Change request record 5000 can also include status data 5013 that specifies whether the change request record specified is an in progress change request currently being defined by an analyst user or a finalized change request. Change request record 5000 can be recorded e.g. in a text-based file format and/or in another format such a set of column data defining a row of data within a database table (stored on a one record per row basis).

At block 1109, manager system 110 can perform machine learning training by application of training data to one or more predictive model stored in models area 2124 of data repository 108. Data repository 108 at block 1084 can responsively receive and apply the training data sent at block 1109 to appropriate predictive models of models area 2124. The data sent as training data at block 1109 can include, according to one embodiment, a change request record associated to a finalized and confirmed change stored by manager system 110 at block 1108. Predictive models trained at block 1109 can be utilized by manager system 110 for return of predictions as to changes to a dimensional hierarchy that will be authored by an analyst user. Manager system 110 on completion of block 1109 can proceed to block 1110.

At block 1110, manager system 110 can determine whether an exit condition has been satisfied. An exit condition can be defined for example by the analyst user performing a user interface action to close a development portal defined by user interface 4000, indicating completion of change request definition activities or can be satisfied by a timeout for example. Where an exit condition is not satisfied, manager system 110 can return to block 1104 to receive additional change request data.

On loop back to block 1104, received change request data can be change request data for a change being defined during a preceding iteration of block 1104 or can be change request data specifying a different change if a prior change was finalized and completed during the preceding iteration. During each iteration of blocks 1104-1105, manager system 110 can be generating (including by updating) a change request record at block 1105, can be examining history data for generation of prompts (block 1106), can acquire specified change data (block 1107), and can be monitoring for completion of a change request and storage of a change request data record with change data into data repository 108 at block 1108, and can be performing machine learning training at block 1109. Blocks 1104-1109 can be performed iteratively until an exit condition is satisfied at block 1110. At block 1110, manager system 110 can proceed to blocks 1111.

At block 1111, user interface 4000 can transition into a guide mode in which a user can be presented with prompting data for guiding further development of a dimensional hierarchy currently being authored. System 100 can be configured so that an analyst user can select a configuration of prompting data which guides further development by display of prompting data that indicates attributes of an historical development of a dimensional hierarchy. Referring to FIG. 4 and block 1103, an analyst user can activate a user selected guide mode with use of interface control 4004 (FIG. 4) or user interface 4000 can automatically transition into a user selected guide mode, on completion of block 1110. System 100 can be configured so that an analyst user can select multiple different configurations for a guide mode. The different guide mode configurations can include for example, a summary view configuration depicted in FIG. 8 and a tag view configuration depicted in FIG. 9. One of the configurations can be a default configuration that can be overridden, e.g. with use of a dropdown menu associated with user interface control element 4004 shown in FIG. 4.

Figure 8:
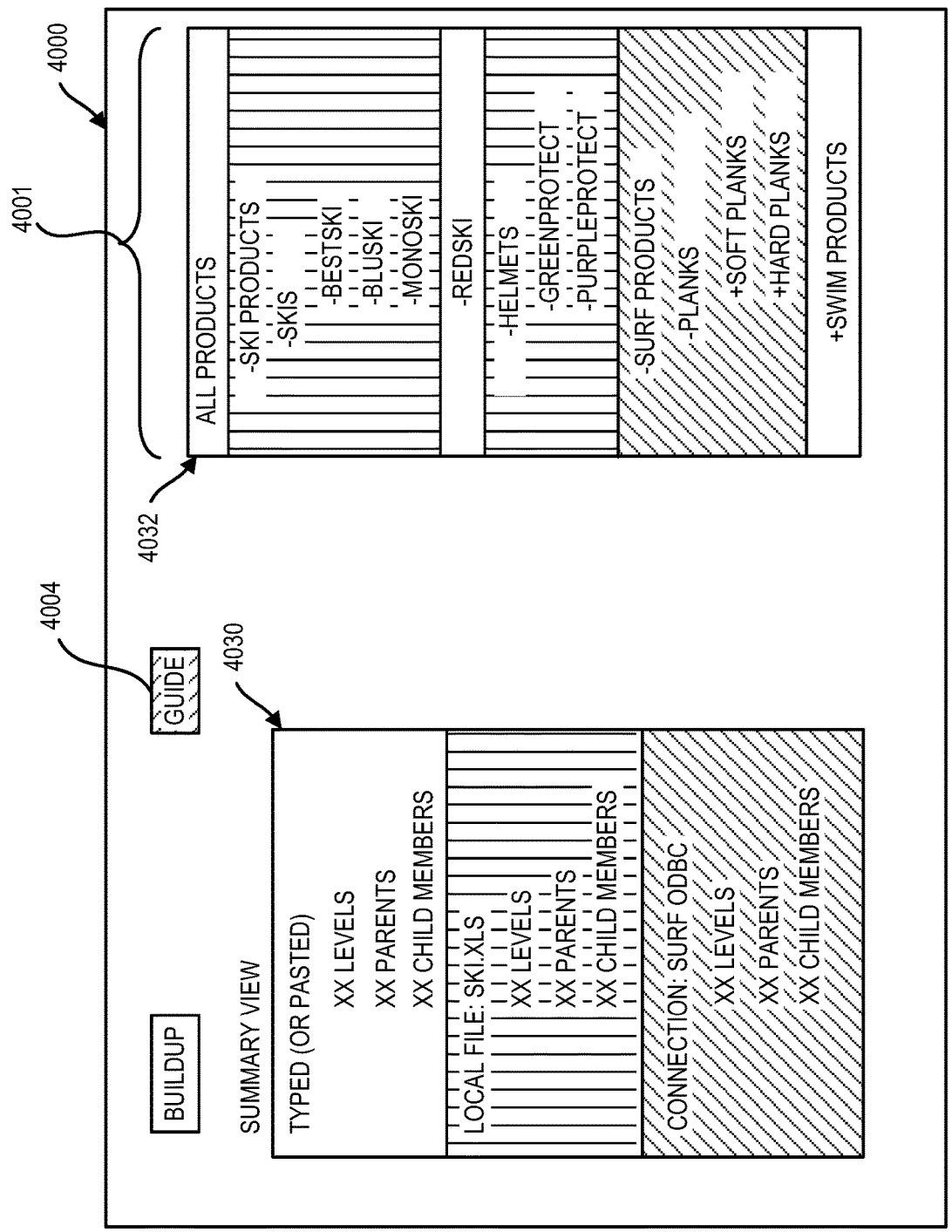
FIG. 8 illustrates an interactive user interface that can be displayed on a client computer device in various stages according to one embodiment.

In the summary view depicted in FIG. 8, user interface 4000 can display summary data specifying the origin of various content of a current dimensional hierarchy authored by an analyst user. In area 4030, summary data can be displayed in an area 4032 of dimensional hierarchy display area 4001. The current dimensional hierarchy, e.g. in graphics can be displayed. In the summary view of area 4030 there can be various display areas that provide summary data as to the origination of content from a dimensional hierarchy. In the summary viewing area 4030 depicted in FIG. 8, three subareas are displayed.

The first subarea displayed summarizes originally authored content, e.g. typed or copy and pasted content of a dimensional hierarchy, a second area for specifying data selected and imported from a first data source, and a third area specifying summary data for dimensional hierarchy content of a second data source. In area 4030, different highlights can be associated to the different subareas for the different respective data sources. Namely, the first highlight for the data source: ORIGINALLY AUTHORED, a second highlight for the second data source, and a third highlight for the third data source. In area 4032 text data defining a current dimensional hierarchy in its currently authored state can be presented with highlights in accordance with the highlights of area 4030 so that an analyst user can quickly discern the origin of content of a dimensional hierarchy in its currently-authored state. The summary data in area 4030 can include such data associated to the respective origination sources of content. Such data can include, e.g. the number of levels from the specified source, the number of parent node members from the specified source, and number of child node members from the specified source. In viewing area 4030, an analyst user can be presented a quick and highly useful overview of how the current dimensional hierarchy was developed. The summary data presented in area 4030 is augmented by the highlighted synergy between area 4030 and 4032 wherein the highlighting of the various sections of area 4030 are highlighted in coordination with the data of area 4032 (e.g. using a common highlight) so that the origin of content in the presented dimensional hierarchy presented in area 4032 can be quickly and easily discerned by an analyst user.

The visualization depicted in FIG. 8 facilitates quick development of further changes to the dimensional hierarchy. For example, the indication from FIG. 8 that certain content of a currently-authored dimensional hierarchy was sourced from a certain source can signal to the analyst user that the specified source may be consulted for further editing of a dimensional hierarchy. The presentment in ease-of-use features set forth with reference to FIGS. 1 and 9 can be particularly beneficial where the analyst user is using, e.g. a mobile, hand-held client computer device having a small screen with limited capacities for receipt of analyst user inputs.

Referring to FIG. 8, the content depicted in area 4032 presented with clear highlight can be originally authored typed or pasted content as indicated in area 4030. The content depicted in area 4032 presented with a vertical line highlight can be content indicated by the subarea of area 4030 having a vertical line content. The content of area 4032 specified with a diagonal line highlight can be content from the source indicated in the summary view area of 4030, subarea having the corresponding diagonal line highlight. While use of highlight coordination is depicted in FIG. 8, other types of highlighting can be utilized. For example, corresponding data sections of area 4030 and 4032, which are connected together visually can be displayed in a common color, for example.

Figure 9:
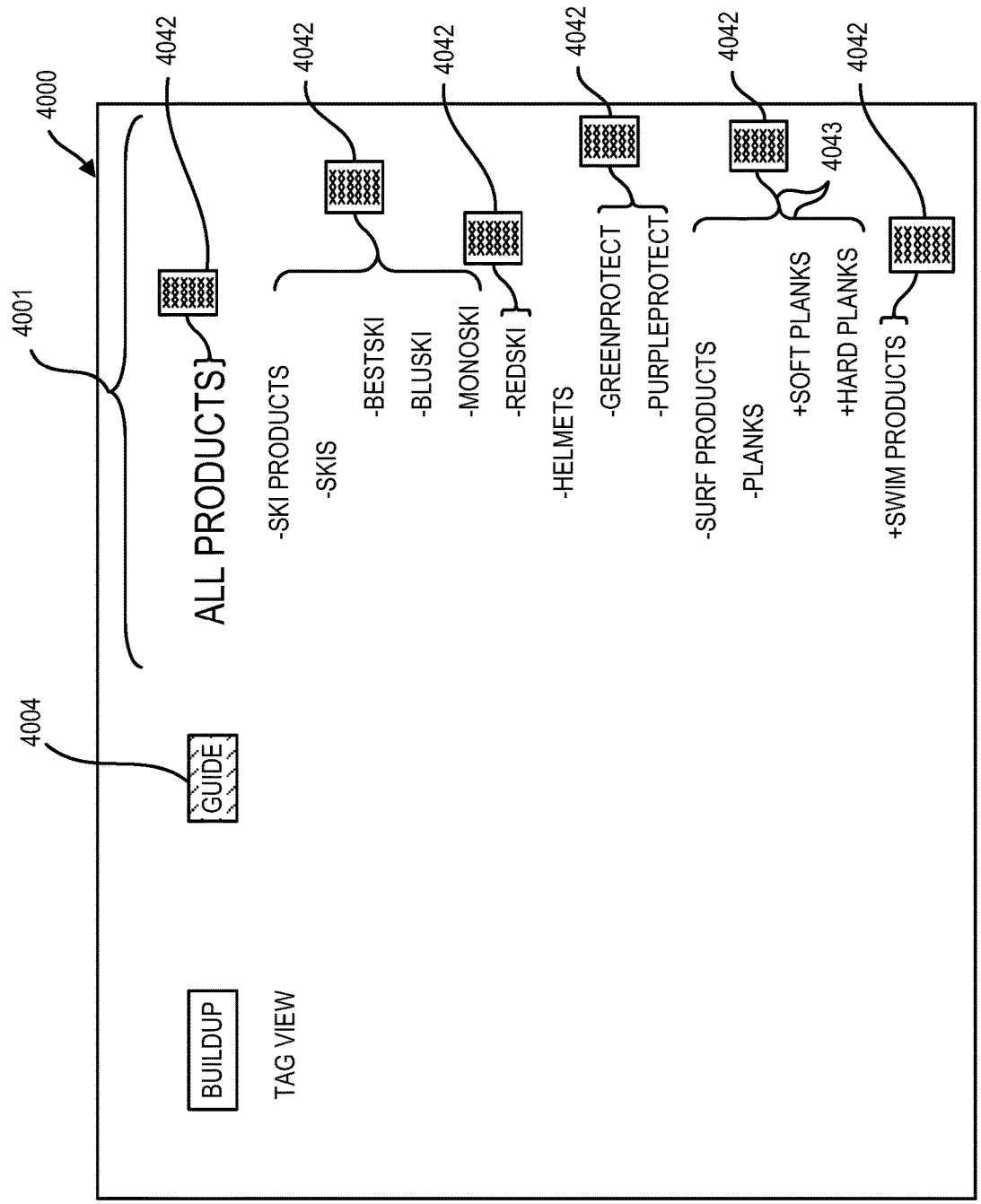
FIG. 9 illustrates an interactive user interface that can be displayed on a client computer device in various stages according to one embodiment.

Another guide configuration is depicted in FIG. 9. In FIG. 9, there is a depicted a tag view presentment of prompting data that can guide an analyst user in further developing a dimensional hierarchy. The prompting data of FIG. 9 can graphically indicate attributes of an historical development of a dimensional hierarchy for guiding of further development of the dimensional hierarchy. In the example of FIG. 9, node blocks of the depicted dimensional hierarchy of dimensional hierarchy display area 4001 are accompanied by text blocks that are spatially associated with to node member blocks of a depicted presented dimensional hierarchy. The text blocks 4042 of user interface 4000 as shown in FIG. 9 can be visually associated to node member blocks of a dimensional hierarchy with use of indicators 4043 such as brackets, lines, arrows and the like. Each of the text blocks 4042 can display text indicating change request data associated to the origination of the respective node member. Each text block can present text specifying the data of a change request record stored into data repository 108 for a respective change to a dimensional hierarchy made in the history of the development of the dimensional hierarchy. Each text block 4042 can include data of a change request record stored for a change as set forth herein including such data as (i) data source; (ii) change classifier; (iii) node specification; (iv) change description; (v) time-stamp; and/or (iv) user ID. User interface 4000 can be configured so that a user can click on any text box to enlarge its view. The various text segments within a text box can be active segments so that on activation of text within a text box, actions or further actions can be activated.

The tag view of FIG. 9 can display comprehensive prompting data on the history of development of a dimensional hierarchy to guide an analyst user in further development of the dimensional hierarchy. For example, where a text box specifies that a certain node member block was authored using a certain data source, an analyst user can be guided to use that same data source for implementing a further change. With the guiding action of user interface 4000 being further refined by the supplementary data respecting change classification, node specification, change description, time stamp and/or user ID data. The guiding attributes of FIG. 9 can particularly facilitate guiding in the case an analyst user is using a client computer device as set forth in FIG. 2 of a mobile having a small screen.

In reference to the guide views of FIGS. 8 and 9, manager system 110 can be configured so that an analyst user can toggle back to a build-up mode at any time, e.g., by clicking on interface control 4002, or system 100 can include a simultaneous mode wherein a guide mode and a build-up mode are simultaneously active, thus allowing an analyst user to continue to build up a dimensional hierarchy by any of the methods described herein while the prompting data of FIG. 8 and/or FIG. 9 is simultaneously being displayed. Thus, for example, system 100 can be configured so that an analyst user can activate a simultaneous build-up and guide mode by double clicking on interface control 4004 with the guide mode active. Thus, the system can be configured to present user-selected prompting data to an analyst user while an analyst user is building up and authoring a currently-authored dimensional hierarchy. With the guide mode active (e.g. including a guide mode with a simultaneously active build-up mode) manager system 110 can iteratively perform a loop comprising blocks of blocks 1101-1112. According to one embodiment of a simultaneous mode, manager system 110 presents prompting data for guiding an analysist user as shown in FIG. 8 and/or FIG. 9 on user interface 4000 whenever dimensional hierarchy display area 4001 is used for authorship of a dimensional hierarchy so that an analysis user's further authorship is guided based on graphical indicators as shown in FIGS. 8 and/or 9 defining prompting data graphically indicating attributes of a history of development of a dimensional hierarchy.

Referring further to the flowchart of FIGS. 3A and 3B, manager system 110 at block 1111 can be receiving selection data sent by client computer device 120A at block 1204 indicating selection of a summary view configuration of FIG. 8 or a tag view of FIG. 9, and the selection data can further specify whether the guide mode is a simultaneous build-up and guide mode. On receipt of the selection data at block 1111, manager system 110 can proceed to block 1112. At block 1112, manager system 110 can examine the selection data and can present prompting data accordance with the view depicted in FIG. 8 and/or FIG. 9. While the prompting data is being displayed, manager system 110 can loop back to block 1101 to perform examination of updates to data sources and also to perform examination of history area 2121 for the automatic generation of actions at block 1101. Manager system 110 can iteratively perform the functions of block 1101, 1102, 1111 and 1112 while user interface 4000 remains open.

In the case a simultaneous guide and build-up mode is active, manager system 110 can iteratively perform blocks 1101, 1102, 1104, 1105, 1106, 1107, 1108, 1109, 1111 and 1112 for a time that user interface 4000 is open. Manager system 110 can perform block 1101, e.g., each time user interface 4000 is opened and can iteratively perform block 1101 in the manner set forth herein or, in another embodiment, manager system 110 can be iteratively performing block 1101, e.g., in the background, without user interface 4000 being open.

Manager system 110 at block 1101 can be iteratively examining data sources of data sources 2122A-2122Z and/or data source of data sources 140A-140Z for updates and can be iteratively examining history data of history area 2121 of data repository 108 for return of action decisions specifying automated actions performed by manager system 110, such as prompting actions for guiding an administrator user in the development of a dimensional hierarchy or actions for updating a dimensional hierarchy without any action by an analyst user. For performing block 1101 manager system 110 can examine change request records associated to each node member of a dimensional hierarchy being authored in its current state. As explained in reference to guide window 4019D (FIG. 6C) a change request record can include a record of an analyst user's selections with reference to auto-updating or AI updating (which can be a default mode). If the auto-updating mode is selected, manager system 110 at block 1101 can automatically perform the updating of the dimensional hierarchy being authored displayed in dimensional hierarchy display area 4001 according to the specified schedule specified using guide window 4019D.

For performing the auto-updating manager system 110 can run script code to perform the updating. The script code can use data of a change request record of the change being updated, such as the data source parameter value specifying a reference to a location of the data source, the node description, and functional data associated to the data source parameter value, so that functions such as filter function and sort functions that are performed with respect to a first importation from data from a certain location of a data source selected by an analyst user are re-performed with respect to updated data when manager system 110 updates a dimensional hierarchy being authored to include updated data of the data source.

Manager system 110 performing block 1101 can include manager system 110 applying a multifactor formula for return of a parameter value indicating a likelihood of an analyst user implementing a change to a dimensional hierarchy in response to an update of a data source, such as a data source of data sources 2122A-2122Z or of data sources 140A-140Z. Manager system 110 at block 1101 can iteratively return a scoring parameter value in response to receipt of data indicating a data source update respecting a dimensional hierarchy using the scoring formula of Eq. 1 as follows.

$$P = F_1 W_1 + F_2 W_2 + F_3 W_3 + F_4 W_4 \qquad \text{(Eq. 1)}$$

Where P is a returned scoring value indicating a likelihood of a user implementing a change in accordance with an update to a database, where $F_1$-$F_4$ are factors, and $W_1$-$W_4$ are weights associated to the various factors. According to one embodiment, $F_1$ can be a use factor, $F_2$ can be a source change percentage factor, $F_3$ can be a change classification change percentage factor, and $F_4$ can be a user factor. Manager system 110 according to factor $F_1$, can apply a relatively lower scoring value, where a current dimensional hierarchy being authored has not been changed previously according to examined history data of history area 2121 of data repository 108 using the data source and manager system 110 can apply a relatively higher scoring value under factor $F_1$ where the data source has been used previously in the authorship in the current dimensional hierarchy. Manager system 110 can apply a still higher scoring value under factor $F_1$ in the case that the data source associated with the update for which there is an update that was previously used for the authorship of a current dimensional hierarchy. Manager system 110 according to factor $F_2$ can examine a source identifier of a received update notification data in connection with history data of history area 2121 of data repository 108 to determine the frequency with which an analyst user has accepted updates from that identified data source and can assign higher or lower scoring values according to factor $F_4$ in accordance with that frequency. For example, manager system 110 according to factor $F_2$ can assign higher scoring values where the analyst user frequently accepts updates from that data source by implementing changes in accordance with the update into a dimensional hierarchy and can assign lower scoring values under factor $F_4$ where the examination of the history data indicates that the analyst user relatively, infrequently accepts updates from that data source. Manager system 110 applying factor $F_3$ can examine the received update notification data to determine a change classification of the update, e.g. node member add, node member delete, node member reordering, and in dependence on the determined change classification of the update can examine history data of history area 2121. Manager system 110 applying factor $F_3$ can apply a relatively higher scoring value according to factor $F_3$ where an analyst user authoring the current dimensional hierarchy frequently accepts changes of the identified change classification of the update and can apply a lower scoring value according to factor $F_3$ where an analyst user, according to the history data, has relatively infrequently accepted updates of the identified change classification of the update. Manager system 110 applying factor $F_4$ can examine history data of history area 2121 specifying identifiers for the analyst user associated to respective changes of the change history data for a current dimensional hierarchy. Manager system 110 applying factor $F_4$ can assign a higher scoring value under factor $F_4$ in dependence on the currently logged in analyst users responsibility for historical changes to the current dimensional hierarchy. Manager system 110 can apply a higher scoring value according to factor $F_4$ where the current analyst user is responsible for a larger percentage of changes in the history of changes of the current dimensional hierarchy and can assign a lower scoring value according to factor $F_4$ where the current user was responsible for and implemented a relatively lower percentage of changes in the history of changes of the current dimensional hierarchy.

The scoring values returned with use of Eq. 1 manager system 110 can determine an action in dependence on a decision data structure.

TABLE A

| Row | Scoring Value | Action Decision |
| --- | --- | --- |
| 1 | $P < 0.5$ | Prompting data classification 1 |
| 2 | $0.5 \leq P < 0.9$ | Prompting data classification 2 |
| 3 | $P \geq 0.9$ | Automatically update dimensional hierarchy |

Where manager system 110 applying Eq. 1 returns a lower range scoring value, e.g. P<0.5, Row 1 can be fired, where manager system 110 applying Eq. 1 returns the scoring value in a medium range, e.g. P≥0.5 and <0.9, Row 2 can be fired, and where manager system 110 applying Eq. 1 returns a scoring value of P≥0.9 Row 3 can be fired. Different action decisions can be associated to the different rows. Where Row 1 is fired, the action decision can be the action decision to perform prompting data classification 1, where Row 2 is fired the action decision can be the action decision to perform prompting data classification 2, where Row 3 is fired the action decision can be the action decision to perform the action decision of auto-update to automatically update the current dimensional hierarchy in accordance with change data of received change notification received from a queried data source, e.g. of data sources 2122A-2122Z and/or data sources 140A-140Z.

In some embodiments, manager system 110 performing block 1101 can include manager system 110 querying data from each data source connected to manager system 110 and having dimensional hierarchy content for updates and can include manager system 110 iteratively querying each data source of data sources 2122A-2122Z and data sources 140A-140Z for return of update notification data specifying dimensional hierarchy updates associated with those respective data sources. Update notification data herein can include query return data returned from a query of a data source indicating that updated data is available from the data source. In another embodiment, manager system 110 can generate at block 1101 queries for determining updates of an intelligently limited number of available data sources connected to system. Namely, a limited number of data sources 2122A-2122Z and data sources 140A-140Z. The intelligent limiting by manager system 110 for performing such querying can include manager system 110 examining list data of a registered list.

System 100 can be configured so that when each new dimensional hierarchy is authored with use of system 100 manager system 110 initializes a data source list registry. The data source list registry can in initialization be absent of any data source identifiers but is incremented to include an identifier of a respective data source each time a new data source is selected by an analyst user for authoring of the dimensional hierarchy. Manager system 110 can be configured, according to one embodiment, so that at block 1101 manager system 110 queries for updates for less than a full set of available data sources available to an analyst user for importation of dimensional hierarchy data, but rather the queries of data sources for updates at block 1101 by manager system 110 is restricted to only those data sources that are specified with identifiers on the described registry list of data sources. In such manner by the configuration described, manager system 110 at block 1101 performs the described query operation with reduced consumption of processing resources and with faster speed and with reduced memory utilization. The action decisions specified in the decision data structure of Table A are now herein further described.

With reference to Row 1 of the decision data structure of Table A, the action decision of prompting data classification 1 can be returned. Manager system 110 in accordance with the action decision of Row 1 of the decision data structure of Table A according to one embodiment can display the prompting data as described with reference to text box 4052 of FIG. 6. Text box 4052 can display a text based notification notifying an analyst user that an update respecting a dimensional hierarchy is available from a data source. A text based notification of text box 4052 of user interface 4000 can specify various data, e.g. an identifier for the data source from which the update is available, a change classifier specifying the type of change of the update within the data source, a node specification specifying a node location for the update at the data source, an update description, and a timestamp for the update at the data source. An analyst user viewing the prompting data of text box 4052 accordingly can be guided to the dimensional hierarchy being authored within the dimensional hierarchy display area 4001 in accordance with the update specified in text box 4052.

As described in connection with the decision data structure of Table A, Row 2 can be fired in the case that in accordance with Eq. 2 there is determined to be a relatively higher likelihood that an analyst user will implement an edit to the dimensional hierarchy being authored in accordance with the update for which update notification data is received in response to query data sent at block 1101.

As specified in the decision data structure of Table A, the prompting data depicted with reference to text box 4052 of FIG. 6 is prompting data in accordance with prompting data classification 1 specified in the decision data structure of Table A. Prompting data in accordance with prompting data classification 2 of the decision data structure of Table A is illustrated in reference to FIG. 9. In accordance with the prompting data classification 2 action decision, the prompting data described with reference to text box 4052 of FIG. 6 can be displayed, and in addition the text box 4054 of FIG. 7 can be displayed.

Text box 4054 can be graphically associated to a block of node members of the displayed dimensional hierarchy being authored with use of graphics, e.g. a bracket, line, or other graphical features. Text box 4054 can be graphically associated to node members of a dimensional hierarchy being authored that will be changed if the dimensional hierarchy is edited in accordance with the update. A text based notification of text box 4054 of user interface 4000 can specify various data, e.g. an identifier for the data source from which the update is available, a change classifier specifying the type of change of the update within the data source, a node specification specifying a node location for the update at the data source, an update description, and a timestamp for the update at the data source. The graphic association of text based node members in the text box 4054 can be provided with use of, e.g. features 4055 such as a bracket and a line as shown in FIG. 7 or other graphical features.

According to one embodiment, text box 4054 can be an active text box configured as an active interface control button so that activation of text box 4054, e.g. by double clicking causes the current dimensional hierarchy being authored using dimensional hierarchy display area 4001 to be updated in accordance with the update of a data source specified within text box 4054. For performing the updating, manager system 110 according to one embodiment can run script code to perform the updating. The script code can use data of a change request record of the change being updated, such as the data source parameter value specifying a reference to a location of the data source, the node description, and functional data associated to the data source parameter value, so that functions such as filter function and sort functions that are performed with respect to a first importation from data from a certain location of a data source selected by an analyst user are re-performed with respect to updated data when manager system 110 updates a dimensional hierarchy being authored to include updated data of the data source. According to one embodiment, performing of the examining change request data at block 1105 by manager system 110 can include manager system 110 recording a command log of commands performed for implementation of a change request being initiated by an analyst user. The command log data can be recorded as part of a change request record. Manager system 110 can generate script code based on the command log to perform functions according to the functions of the command log and can store the generated script code with a change request record for a certain dimensional hierarchy change at recording block 1108 so that history area 2121, for each implemented change implemented with the dimensional hierarchy being authored stores with the change request data record for the change, a script code package for reperforming the change when updated data is available at a specified data source associated with the change.

According to one embodiment, text box 4054 can be an active text box so that the described script code package for reperforming a change is executed when text box 4054 is activated by an analyst user. Text box 4054 can be configured according to one embodiment so that when text box 4054 is activated script code is run to automatically update a node member block of the dimensional hierarchy displayed in display area 4001 with an updated block updated at a data source and available from the data source.

According to one embodiment, user interface 4000 can have an associated configuration area. According to Row 3 of the decision data structure of Table A, the action decision associated with Row 3 is the action decision to automatically implement an update edit to a dimensional hierarchy being authored in accordance with an update available at a data source. When a scoring value P, using Eq. 2 is returned with a value to trigger the action decision at Row 3 a node member block of a dimensional hierarchy being authored can be automatically updated to include the update appearing at a data source without any user action. The automatic updating of a dimensional hierarchy can be performed by activating automatic execution of the described script code described with reference to text box 4054 which causes a prior edit performed with reference to a dimensional hierarchy being authored to be reperformed using updated data of the same data source used to perform the earlier change.

System 100 can be configured so that system 100 can present prompts for guiding of an analyst user in the development of changes to a dimensional hierarchy being authored while the analyst user is in the process of defining change request data to define a change to a dimensional hierarchy. As set forth in reference to block 1105, manager system 110 can iteratively perform block 1105 to iteratively update a change request record while an analyst user interacts with user interface 4000 to define change request data.

An analyst user can be performing such actions to define change request data such as moving a finger or pointer to different areas of a displayed dimensional hierarchy of dimensional hierarchy display area 4001 and/or moving a finger cursor to different areas of the left side of user interface 4000, e.g. for the selection of a particular data source. Manager system 110 during iterations of block 1105 can be iteratively updating a change request record until a change request record has been finalized, e.g. by the detection of termination data defined by a change request termination action of an analyst user.

Manager system 110 at block 1106 can be examining history data of data repository 108 for return and in dependence on the examining can be generating prompts. Manager system 110 performing block 1106 can include manager system 110 iteratively querying data repository 108 as indicated by query receive and respond block 1082 performed by data repository 108. The history data examined at block 1106 can include history area 2121 and/or history data included in models area 2124 of data repository 108. Manager system 110 can examine history data of data repository 108 in dependence on examined change request data examined at block 1105 and can examine history data and generate prompts at block 1106 in dependence on an interim change request record generated at block 1105 that is generated prior to finalization of a change request by an analyst user, e.g. prior to defining of a change request termination data by an analyst user. Manager system 110 examining history data at block 1106 can include manager system 110 querying a predictive model that has been trained with use of historical data generated by system 100.

Figure 10:
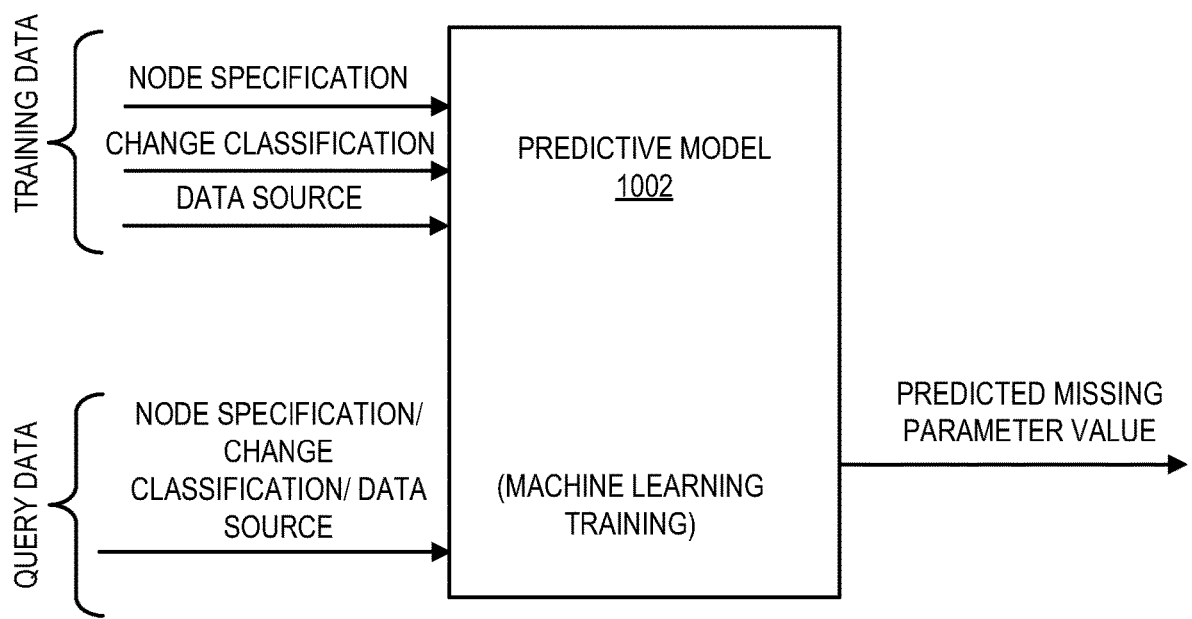
FIG. 10 illustrates a predictive model that can be used for return of predictions according to one embodiment.

FIG. 10 depicts predictive model 1002 which can be trained with use of iteratively applied training data. Training data applied for training of predictive model 1002 can include iteratively applied sets of training data. Each set of iteratively applied training data can include data from a finalized change request record recorded and stored into data repository 108 that can specify for each dimensional hierarchy change specified by an analyst user such data as (i) data source; (ii) change classifier; (iii) node specification; (iv) change description; (v) timestamp; and (vi) user ID.

According to one embodiment that is described with reference to FIG. 10, iteratively applied training data can include a set of training data applied for training of predictive model 1002 and can include change request record data associated to a historical change for a certain dimensional hierarchy. Each iteratively applied set of training data can include the following: (a) node specification data for a certain change; (b) change classification data for the certain change; and (c) data source data for the certain change. Each set of training data applied to predictive model 1002 can be associated to a different change of a dimensional hierarchy authored by an analyst user that is identified by a particular change request record.

Referring to the flowchart of FIGS. 3A-3B, manager system 110 on completion of finalization of a change request record for a certain change can store the change request data at block 1108 into data repository 108 and can proceed to block 1109 to apply data of the finalized and stored change request record for training of predictive model 1002 at block 1109. Thus, for each change implemented with respect to a particular dimensional hierarchy, manager system 110 can apply training data including data associated to the change, e.g. node specification data, change classification data, and data source data for training of predictive model 1002. Manager system 110 according to one embodiment can instantiate an instance of predictive model 1002 for each new dimensional hierarchy that is initiated for authoring. According to one embodiment, manager system 110 can instantiate predictive model 1002 for each analyst user recognized by system 100. The latter embodiment can offer than advantage of predictive model 1002 being sufficiently trained with corpus training data at a time of an initialization of a dimensional hierarchy for authoring. According to one embodiment, manager system 110 can instantiate N instances of predictive model 1002 for each initialized dimensional hierarchy, wherein there is one instance of predictive model 1002 instantiated for each recognized analyst user of the initialized dimensional hierarchy.

Further regarding predictive model 1002 set forth in FIG. 10, predictive model 1002 trained with the training data described is able to learn relationships between node specifications, change classifications, and data sources. For example, in the course of authoring dimensional hierarchies an analyst user may regularly make changes in a dimensional hierarchy in respect to a certain dimensional hierarchy location (as specified by a node specification) of a particular type of change (change classification) using a particular data source (data source data). Accordingly, predictive model 1002 trained with the training data described is able to use tendencies of an analyst user in making changes to a dimensional hierarchy. Predictive model 1002 once trained is able to respond to query data.

Query data applied to predictive model 1002 can include query data defined by data of an interim change request record in its current state during a most recent iteration of block 1105. While change request data is being iteratively defined prior to termination of a change request only one or two parameter values from the parameter values node specification, change classification, and data source may be known while change request data is being iteratively defined prior to termination of a change request. For example, prior to termination of a change request an administrator user may have defined with interactions, e.g. with finger or pointer-based interactions with user interface 4000, node specification and a change classification for a change being defined but not a data source or alternatively, by interactions with user interface 4000 may have defined a node specification and a data source for a change being defined but may not yet have defined sufficient change request data for a change classification to be determined. An analyst user may also have defined sufficient change request data to specify a change classification and a data source of a change being defined but may not have defined sufficient change request data to specify a node specification.

In other scenarios an analyst user may have, with use of user interface 4000, defined change request data sufficient to specify only one of the parameter values: node specification, change classification, or data source. Manager system 110 at block 1106 can apply such partial set of parameter values defining a change request as query data to predictive model 1002 at block 1106. In response to receipt of the partial parameter values defining of a change request in the process of being defined by an analyst user, predictive model 1002 can return one or more predicted missing parameter value. For example, if at block 1106 the partial set of parameter values of node specification and change classification are applied as known for a change request in the process of being defined is applied as query data for predictive model 1002, predictive model 1002 can return a predicted parameter value for data source. If another set of two parameter values currently determined for the change request in the process of being defined have been determined at block 1105, application of the two parameter values to predictive model 1002 as query data can result in predictive model 1002 returning the missing third parameter value. In addition, if only one of the parameter values for a current change request in the process of being defined has been determined at block 1105, manager system 110 can apply the single parameter value to predictive model 1002 as query data and predictive model 1002 can return predicted values for the two missing parameter values.

Based on the returned predicted missing one or more parameter values, manager system 110 at block 1106 can generate prompting data to guide the analyst user to select an action in accordance with the predicted missing one or more parameter value.

According to one illustrative example with reference to FIG. 7, the dimensional hierarchy data in dimensional hierarchy display area 4001 of user interface 4000 and another illustrative embodiment can have a different development history than the development history previously described and can be part of a large scale dimensional hierarchy having, e.g. hundreds to thousands of node members. According to an illustrative example, predictive model 1002 with use of training data may have used the tendency that an analyst user tends to select source A as a data source when making dimensional hierarchy changes of the change classification two-layer node member group add. Thus, according to a responsive prompting data feature which can be incorporated into system 100, manager system 110 at block 1106 can generate and send prompting data for receipt by client computer device 120A at block 1203 to display prompting data defined by text box 4062 of FIG. 7. Prompting data defined by text box 4062 can include text based prompting data in text box 4062 prompting the analyst user to select source A according to the tendency of the analyst user.

With further reference to FIG. 7 according to another example predictive model 1002 may have been trained with training data such that predictive model 1002 has learned that while the analyst user in the previously described scenario has a tendency to select source A when making two-layer node member group additions, the user demonstrates an overriding tendency to select source B when making two-layer node member group additions under a dimensional hierarchy specified by the node specification of PARENT="SKI PRODUCTS"; GRANDPARENT="ALL PRODUCTS". Further, with the described scenario an analyst user can interact with user interface 4000 first to indicate that the analyst user is making the two-layer group addition, in which case the previously described prompting data can be displayed in text box 4062 but then may further interact with user interface 4000 to further indicate that the change is at a location of the dimensional hierarchy defined with the node specification descriptor noted previously of node specification PARENT="SKI PRODUCTS"; GRANDPARENT="ALL PRODUCTS". In such a scenario, applied query data applied to predictive model 1002 can return the prediction that source B will be selected and not source A, in which case prompting text box 4062 of FIG. 7 can be automatically updated to include prompting data to prompt the user to select source B and not source A.

In another scenario, predictive model 1002 can have been trained with training data so that predictive model 1002 has learned the tendency, wherein when an analyst user selects source C, the analyst user tends to make three-layer node member group additions to the dimensional hierarchy being authored. In such a scenario, interactions of an analyst user with user interface 4000 to indicate the selection of source C, which with reference to FIG. 7 may include the selection of the XML data source for example, can result in applied query data applied to predictive model 1002 returning the prediction that the analyst user will make a three-layer node member group addition to the dimensional hierarchy being authored. In such a scenario, text box 4062 of FIG. 7 in the described example can display text prompting a user, e.g. to define change request data specifying a location of a three-layer node member group addition to the dimensional hierarchy being authored.

Figure 11:
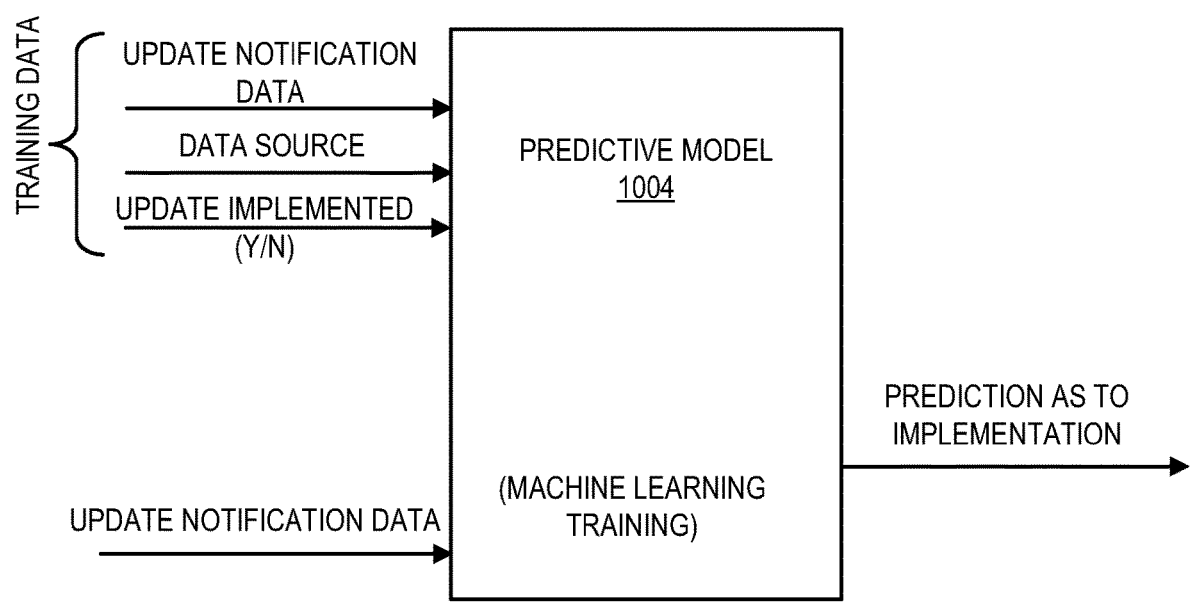
FIG. 11 illustrates a predictive model that can be used for return of predictions according to one embodiment.

Another predictive model for use with system 100 is shown in FIG. 11. Predictive model 1004 can be used to predict whether an analyst user will change a dimensional hierarchy being authored in response to update notification data indicating that a data source had been updated with new dimensional hierarchy data. Manager system 110 for training predictive model 1004 can maintain track of update notification data received at block 1101 and can also maintain track of whether an analyst user updated a certain dimensional hierarchy in response to the update notification data. For each update event tracked by manager system 110, manager system 110 can apply an iteration of training data. Each iteration of training data can include (a) update notification data; (b) data source data; and (c) a flag indicating whether an analyst user changed a dimensional hierarchy based on the update notification data. The applied update notification data applied for each update can be multidimensional and can have such data as node specification data that specifies specific text based labels associated with the data in member node location. The update notification data applied as training data can also or in addition include change classification data.

Trained over multiple iterations using such described training data, predictive model 1004 can learn tendencies of an analyst user in changing or not changing a dimensional hierarchy in response to instances of received update notification data. Various tendencies can be learned over time, e.g. that an analyst user tends to implement changes in dependence, e.g. on data source, node specification data, and/or change classification data.

Predictive model 1004 once trained is able to respond to query data. Query data can include update notification data received by manager system 110 at block 1101. Manager system 110 at block 1101 can user predictive model 1004 to predict whether an analyst user will change a dimensional hierarchy being authored in place of or in combination with the predictive model defined by Eq. 1. According to one example predictive results associated with use of predictive model 1004 can be expressed as an additional weighted factor of Eq. 1. Predictive model 1004 can return predictions having associated likelihood parameter values and based on the different levels of probability returned with use of predictive model 1002, predictive model 1004 can be used in combination with the decision data structure of Table A for return of action decisions.

Manager system 110 according to one embodiment can instantiate a single instance of predictive model 1002 for a respective dimensional hierarchy being authored or according to another embodiment, predictive models 1002 and 1004 for each of N user authors recognized to have authored changes to an initialized dimensional hierarchy. According to another embodiment, manager system 110 can instantiate an instance of predictive model 1004 for each recognized analyst user of system 100 and can use predictive model 1004 for return of predictions with respect to multiple different dimensional hierarchies being authored with use of system 100. The presentment in ease-of-use features set forth with reference to FIGS. 1 and 9 can be particularly beneficial where the analyst user is using, e.g. a mobile, hand-held client computer device having a small screen with limited capacities for receipt of analyst user inputs.

Various available tools, libraries, and/or services can be utilized for implementation of predictive model 1002 and/or predictive model 1004. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one possible implementation, a machine learning service provided by IBM® WATSON® can provide access to libraries of APACHE® SPARK® and IBM® SPSS® (IBM® WATSON® and SPSS® are registered trademarks of International Business Machines Corporation and APACHE® and SPARK® are registered trademarks of the Apache Software Foundation. A machine learning service provided by IBM® WATSON® can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Training predictive model 1002 and/or predictive model 1004 can include use of e.g. support vector machines (SVM), Bayesian networks, neural networks and/or other machine learning technologies.

There is set forth herein according to one embodiment a system and method to add members to a dimensional hierarchy from multiple data sources while tracking origin composition for later updating. Embodiments herein recognize that within the domain of Business Analytics, and Financial Planning in particular, there is a method to organize data into dimensional hierarchies. These hierarchies are used in planning applications to aggregate data for driving action decisions in such a manner that business users can understand how their business is doing.

In order to populate what can be extensive hierarchies, embodiments herein recognize that it would be helpful to build up dimensional hierarchies from different original sources. These sources can include e.g. a CSV data source, an XLS data source, an ODBC data source, an ODBO data source, an XML data source, and a JSON data source. Some dimensional hierarchies can be defined by original authorship and can have the associated data source of: originally authored. Embodiments herein recognize that over time, relationships represented by dimensional hierarchies change and accordingly dimensional hierarchies defined by planning application data needs to be updated so that relationships of an enterprise are accurately represented.

Embodiments herein recognize that with current planning systems it is not possible to learn how a dimensional hierarchy in its current state has been created. If another analyst user has to take over the job of the original analyst user, they currently can't see where the data defining the dimensional hierarchy came from, and how it was built up. It is not possible to replace multiple node member blocks of a dimensional hierarchy at once, or update a part of the dimensional hierarchy regularly. Providing a dimensional hierarchy that accurately represents relationships within an enterprise can be a function of luck, e.g. if an analyst user is lucky enough to become aware of a change in a relationship within an enterprise the analyst user can manually make a corresponding change to a dimensional hierarchy.

Embodiments herein allow an analyst user to use multiple ways to add members to a dimensional hierarchy and once they're added, the system will show the build-up of the origin(s) of the hierarchy as blocks. This allows the analyst to update and to maintain the hierarchy with the full knowledge and decomposition of its history. The biggest advantages are that the Analyst can: see how the hierarchy was built up; modify the "parts" of the member hierarchy that need updating, as the historic origin is known; replace those parts of the hierarchy that need to be updated (e.g. if a product line has changed, they need to reload only that part of the hierarchy that is impacted); know where members come from within large hierarchies that contain many members; apply one component of the build-up to other dimensional hierarchies and maintain the component in a single place.

There is set forth herein according to one embodiment, a computer-implemented process for changing members in a dimensional hierarchy using multiple data sources while tracking origin composition, the computer-implemented process comprising: importing a first structure from a first data source into the dimensional hierarchy creating an updated hierarchy; importing a second structure from a second data source into the dimensional hierarchy creating a further updated hierarchy; adding one or more members to the further updated hierarchy; displaying a visualization of parts of the further updated hierarchy, organized into blocks, each block representing a respective source; and selecting an action from the visualization, for a selected part of the hierarchy, from a group consisting of a change of parts of the hierarchy that come from different sources, a replacement of the parts of the hierarchy that come from different sources, removal of a whole block of members directly, and movement of the whole block to another hierarchy, add a date to information for a build-up, modify content of a block, set automatic updates when an original source is updated, and replace the whole block of members at once.

Figure 12:
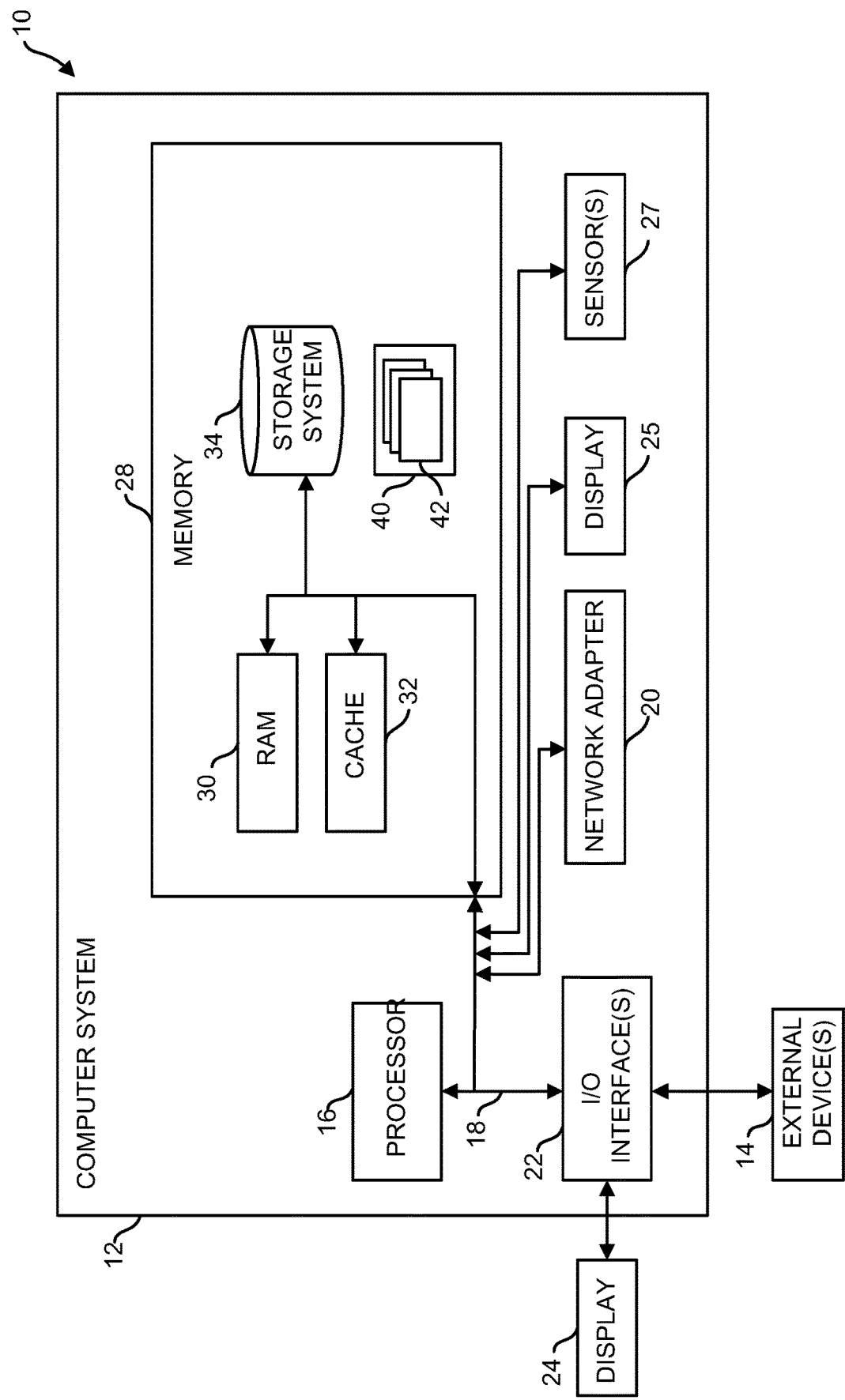
FIG. 12 depicts a computing node according to one embodiment.
Figure 13:
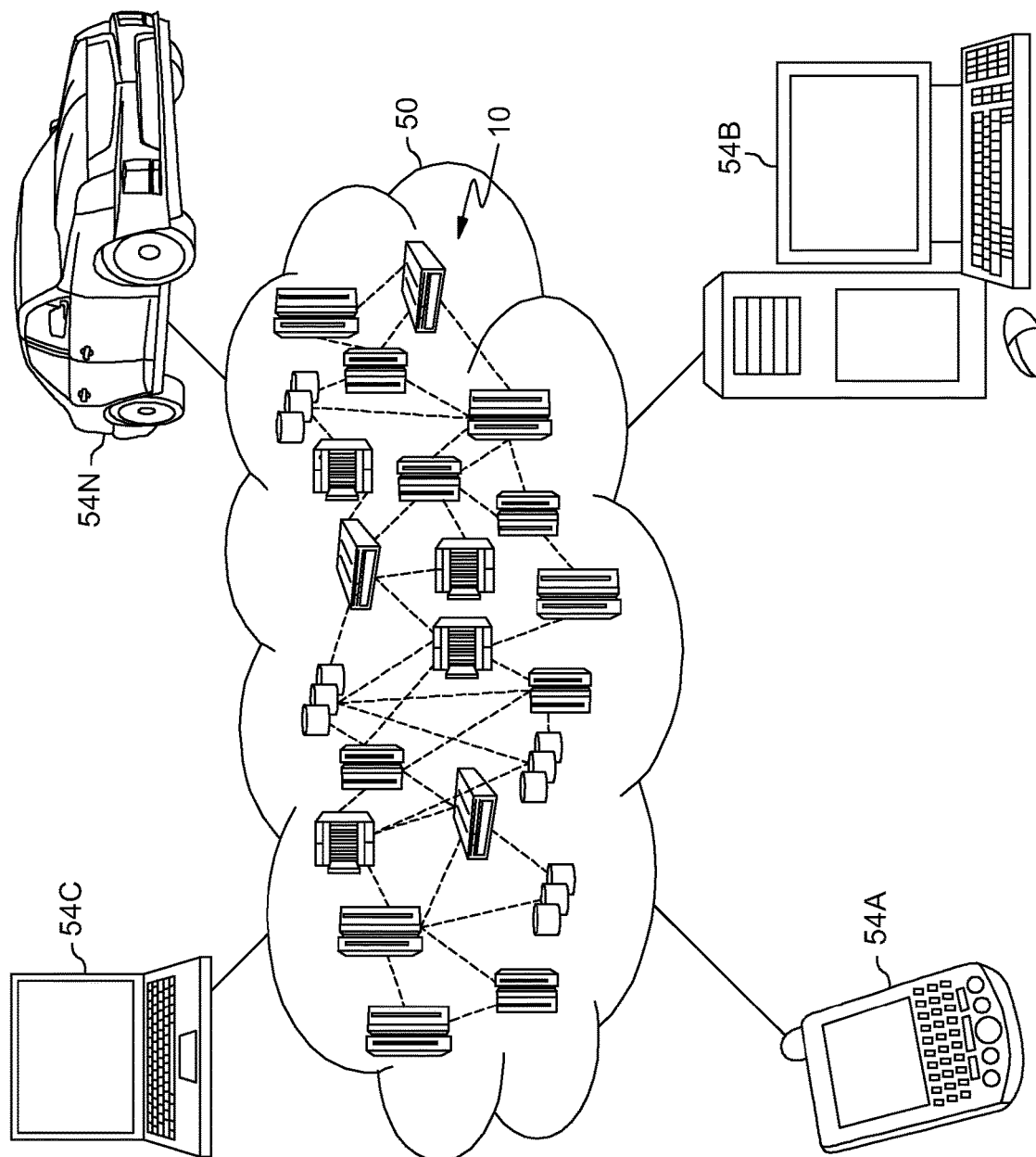
FIG. 13 depicts a cloud computing environment according to one embodiment.
Figure 14:
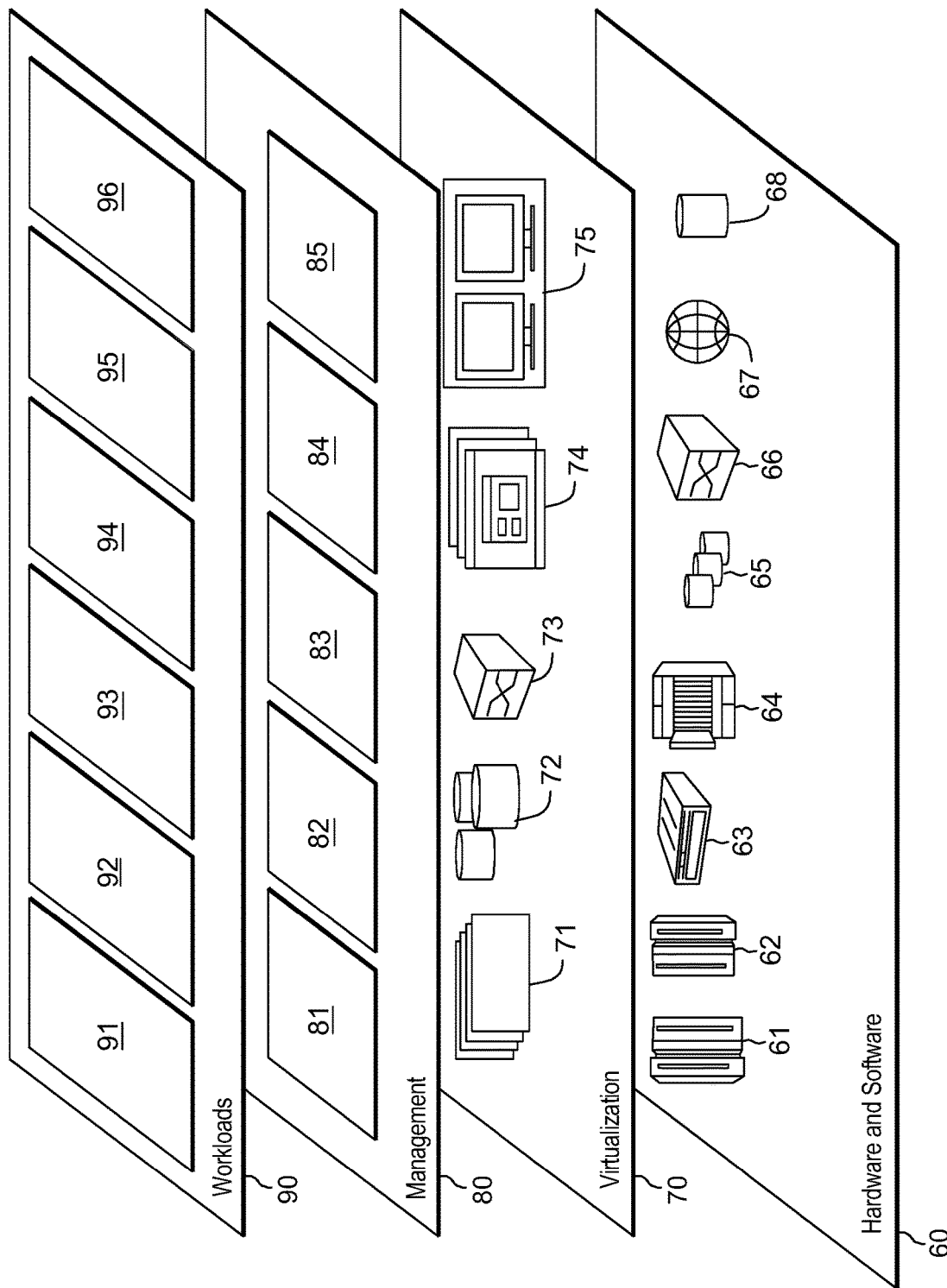
FIG. 14 depicts abstraction model layers according to one embodiment.

Certain embodiments herein may offer various technical computing advantages involving computing advantages arising in the realm of computer networks and computer systems. Embodiments herein can include recording of history data into a data repository and later using that data for return of action decision. Action decisions can include, e.g. prompting actions to guide an analyst user to take certain action or actions to automatically implement change in a dimensional hierarchy in dependence on a prediction returned with use of artificial intelligence (AI) processes. Embodiments herein can include maintaining a registry list of data sources previously used by an analyst user for buildup of hierarchical data within a dimensional hierarchy being authored and generating queries for return of data from respective ones of the data sources in dependence on the registry list. Embodiments herein can include use of a user interactive user interface, wherein actions of an analyst user return a data record specifying attributes of a change request defined by an analyst user. Interim data of a change request can be used to drive prompts that interactively engage an analyst user while the user is interacting with a user interface to define a change to a dimensional hierarchy. Other prompting features that can be implemented can include the running of AI processes in the background intermediate of change request definition sessions of an analyst user. Prompting and visualization features realized via AI and predictive analytics including with machine learning can facilitate the use of a user interface displayed on a mobile handheld client computer device having a small screen with limited space for use in prompting entered inputs. Even where the application involves the access of data from multiple data sources. Data that is recorded in response to an analyst user's use of an interactive interface can be applied as training data to one or more predictive model for return of predictions as to future actions of an analyst user. Various decision data structures can be used to drive artificial intelligence (AI) decision making, such as decision data structure that cognitively maps determined likelihoods associated with a prediction with action decisions. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription FIGS. 12-14 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 12, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 12, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 13-14.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to functions described with reference to manager system 110 as set forth in the flowchart of FIGS. 3A and 3B. In one embodiment, one or more client computer device 120A-120Z can include one or more computing node 10 and can include one or more program 40 for performing functions described with reference to one or more client computer device 120A-120Z as set forth in the flowchart of FIGS. 3A-3B. In one embodiment, data sources 2122A-2122Z, and 140A-140Z can include one or more computing node 10 and can include one or more program 40 for performing functions described with reference to data sources 2122A-2122Z, and 140A-140Z as set forth in the flowchart of FIGS. 3A-3B. In one embodiment, the computing node based systems and devices depicted in FIG. 1 can include one or more program for performing functions described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 13 computing node 10 is described as being implemented in a cloud computing environment and accordingly is referred to as a cloud computing node in the context of FIG. 13.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for facilitating development of a dimensional hierarchy. The processing components 96 can be implemented with use of one or more program 40 described in FIG. 12.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements but is not limited to possessing only those one or more steps or elements. Likewise, a step of a method or an element of a device that "comprises," "has," "includes," or "contains" one or more features possesses those one or more features but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
examining change request data defined by a certain analyst user with use of a user interface of a planning application, the change request data defining a change to a dimensional hierarchy used by the planning application, wherein the user interface includes an area that displays a dimensional hierarchy being authored by the certain analyst user;
generating a change request data record in dependence on the examining, wherein the change request data record specifies attributes of the change to the dimensional hierarchy; and
using data of the change request data record to present prompting data for guiding the certain analyst user in further changing the dimensional hierarchy, wherein the prompting data is defined by a text box displayed on the user interface specifying that updated dimensional hierarchy data for use in updating the dimensional hierarchy being authored by the certain analyst user is available at a certain data source, wherein the user interface presents an active button defined by the text box, which when activated by the certain analyst user causes script code to be run so that the dimensional hierarchy being authored by the certain analyst user is updated in accordance with the updated dimensional hierarchy data.

2. The computer implemented method of claim 1, wherein the prompting data is prompting data to notify the certain analyst user that an update to the dimensional hierarchy is available from a certain data source associated to the user interface.

3. The computer implemented method of claim 1, wherein the method includes presenting guide data to guide the certain analyst user to define the change request data, the guide data guiding the certain analyst user to select a certain data source, the guide data further guiding the certain analyst user to select a certain location of the certain data source.

4. The computer implemented method of claim 1, wherein the change request data defining a change is change request data of an in progress change request currently being defined by the certain analyst user with use of the user interface, and wherein the prompting data is prompting data for prompting the certain analyst user while the certain analyst user is using the user interface to define the in progress change request currently being defined by the certain analyst user with use of the user interface.

5. The computer implemented method of claim 1, wherein the prompting data includes prompting data to graphically indicate respective first and second different node member blocks of the dimensional hierarchy have originated from first and second different respective data sources, the prompting data including text based identifiers for the first and second data sources, and a differentiated highlight associated respectively to the first and second different node member blocks.

6. The computer implemented method of claim 1, wherein the prompting data includes prompting data to graphically indicate respective first and second different node member blocks of the dimensional hierarchy, the prompting data including first and second respective text boxes including the text box associated respectively to the first and second node member blocks, wherein the respective text boxes specify whether the respective node member blocks were authored as an originally authored node member block or were authored using dimensional hierarchy data from a data source, wherein the respective text boxes further specify an identifier for an analyst authoring the historical change to the dimensional hierarchy indicated by the respective text box, and timestamp of the historical change.

7. The computer implemented method of claim 1, wherein the method includes tracking sources of the respective data sources used by analysts in making changes to the dimensional hierarchy and maintaining based on the tracking a list of used data sources used for authoring the dimensional hierarchy, wherein the method includes iteratively querying sources of the respective data sources, wherein the iteratively querying includes iteratively querying a restricted set of sources of the respective data sources, wherein the restricted set of data sources is restricted in dependence on the list of used data sources.

8. The computer implemented method of claim 1, wherein examining change request data defined by the certain analyst user includes examining change request data defined by the certain analyst user to specify a certain location of the certain data source, wherein the generating the change request data record in dependence on the examining includes generating the change request record to include a reference to the certain location of the certain data source.

9. The computer implemented method of claim 1, wherein the method includes querying a plurality of data sources associated to the user interface for updates to hierarchy data, determining that updated dimensional hierarchy data is available from a certain source of the plurality of data sources, performing a predicting as to whether the certain analyst user will perform an update to the dimensional hierarchy using the updated dimensional hierarchy data and presenting the prompting data in dependence on the performing the predicting.

10. The computer implemented method of claim 1, wherein the using data of the change request data record to present prompting data includes querying a predictive model with use of the data of the change request data, wherein the predictive model has been trained with iterations of training data for training the predictive model by machine learning, wherein respective iterations of the training data include for a respective analyst made historical changes to the dimensional hierarchy a plurality of parameter values including (i) a data source associated to the respective historical change; (ii) a node specification associated to the respective historical change specifying a node member location of the respective historical change; and (iii) a change classification associated to the respective historical change, wherein the change request data defining a change is change request data of an in progress change request currently being defined by the certain analyst user with use of the user interface, wherein the predictive model has been trained so that in response to the querying the predictive model the predictive model returns a prediction as to a finalized change request of the certain analyst user associated to the in progress change request currently being defined by the certain analyst user.

11. The computer implemented method of claim 1, wherein the method includes performing a predicting as to whether the certain analyst user will perform an update to the dimensional hierarchy, wherein the performing the predicting includes using a frequency with which dimensional hierarchy updates available from data sources associated to the user interface have been implemented as changes to the dimensional hierarchy being authored.

12. The computer implemented method of claim 1, wherein the using data of the change request data record to present prompting data includes querying a predictive model with use of the data of the change request data, wherein the predictive model has been trained with iterations of training data for training the predictive model by machine learning, wherein respective iterations of the training data include for respective analyst made historical changes to the dimensional hierarchy a plurality of parameter values, wherein the predictive model has been trained so that in response to the querying the predictive model the predictive model returns a prediction as to a finalized change request of the certain analyst user associated to the in progress change request currently being defined by the certain analyst user.

13. The computer implemented method of claim 1, wherein the prompting data is prompting data to notify the certain analyst user that an update to the dimensional hierarchy is available from a certain data source associated to the user interface, and wherein the prompting data indicates that the dimensional hierarchy currently being authored by the certain analyst user has previously been updated using the certain data source.

14. The computer implemented method of claim 1, wherein the method includes performing a predicting as to whether the certain analyst user will perform an update to the dimensional hierarchy, wherein the performing the predicting includes examining historical data that specifies historical changes to the dimensional hierarchy being authored based on dimensional hierarchy updates available from data sources associated to the user interface.

15. The computer implemented method of claim 1, wherein the prompting data includes prompting data to graphically indicate respective first and second different node member blocks of the dimensional hierarchy have originated from first and second different respective data sources, the prompting data including first and second respective text boxes including the text box associated respectively to the first and second node member blocks.

16. The computer implemented method of claim 1, wherein the prompting data includes prompting data to graphically indicate respective first and second different node member blocks of the dimensional hierarchy, the prompting data including first and second respective text boxes including the text box associated respectively to the first and second node member blocks, wherein the first respective text box specifies that the first respective node member block was authored as an originally authored node member block, and wherein the second respective text box specifies that the second respective node member block was authored using dimensional hierarchy data from a data source.

17. The computer implemented method of claim 1, wherein the prompting data includes prompting data to graphically indicate respective first and second different node member blocks of the dimensional hierarchy, the prompting data including first and second respective text boxes including the text box associated respectively to the first and second node member blocks, wherein the first respective text box specifies that the first respective node member block was authored using dimensional hierarchy data from a data source, and wherein the second respective text box specifies that the second respective node member block was authored using dimensional hierarchy data from a second data source different from the data source.

18. A computer implemented method comprising:
examining change request data defined by a certain analyst user with use of a user interface of a planning application, the change request data defining a change to a dimensional hierarchy used by the planning application, wherein the user interface includes an area that displays a dimensional hierarchy being authored by the certain analyst user;

generating a change request data record in dependence on the examining, wherein the change request data record specifies attributes of the change to the dimensional hierarchy; and using data of the change request data record to present prompting data for guiding the certain analyst user in further changing the dimensional hierarchy, wherein the method includes performing a predicting as to whether the certain analyst user will perform an update to the dimensional hierarchy, wherein the performing the predicting includes examining historical data that specifies historical changes to the dimensional hierarchy being authored based on dimensional hierarchy updates available from data sources associated to the user interface.

19. The computer implemented method of claim 18, wherein the user interface presents an active button defined by a text box, which when activated by the certain analyst user causes script code to be run so that the dimensional hierarchy being authored by a certain analyst user is updated in accordance with the updated dimensional hierarchy data.

20. A computer implemented method comprising:

examining change request data defined by a certain analyst user with use of a user interface of a planning application, the change request data defining a change to a dimensional hierarchy used by the planning application, wherein the user interface includes an area that displays a dimensional hierarchy being authored by the certain analyst user;

generating a change request data record in dependence on the examining, wherein the change request data record specifies attributes of the change to the dimensional hierarchy; and using data of the change request data record to present prompting data for guiding the certain analyst user in further changing the dimensional hierarchy, wherein the prompting data includes prompting data to graphically indicate respective first and second different node member blocks of the dimensional hierarchy, the prompting data including first and second respective text boxes associated respectively to the first and second node member blocks, wherein the first respective text box specifies that the first respective node member block was authored as an originally authored node member block, and wherein the second respective text box specifies that the second respective node member block was authored using dimensional hierarchy data from a data source.

* * * * *